(12) United States Patent  
Shepard et al.

(10) Patent No.: US 8,500,940 B2  
(45) Date of Patent: Aug. 6, 2013

(54) HOOK-ENGAGEABLE FASTENER SHEETS, AND METHODS AND ARTICLES OF MANUFACTURE

(75) Inventors: William H. Shepard, Amherst, NH (US); George A. Provost, Litchfield, NH (US)

(73) Assignee: Velcro Industries B.V., Willemstad, Curacao ( * ) Notice: Subject to any disclaimer, the term of this patent is extended or adjusted under 35 U.S.C. 154(b) by 136 days.

(21) Appl. No.: 11/321,825

(22) Filed: Dec. 29, 2005

(65) Prior Publication Data

US 2006/0102037 A1    May 18, 2006

Related U.S. Application Data

(63) Continuation of application No. 10/657,507, filed on Sep. 8, 2003, now Pat. No. 7,160,600, which is a continuation of application No. 09/322,663, filed on May 28, 1999, now abandoned.

(51) Int. Cl.  
*B32B 38/14* (2006.01)  
*B42D 15/00* (2006.01)

(52) U.S. Cl.  
USPC ............................................ 156/277; 428/100

(58) Field of Classification Search  
USPC ........................................ 156/277; 428/100  
See application file for complete search history.

(56) References Cited

U.S. PATENT DOCUMENTS

| | | | |
|---|---|---|---|
| 3,338,291 A | 8/1967 | Kintner | 160/348 |
| 3,491,909 A | 1/1970 | Ikelheimer | 217/7 |
| 3,574,019 A | 4/1971 | Girard | |
| 3,695,976 A | 10/1972 | Erb | |
| 3,817,015 A | 6/1974 | Frangos | |
| 3,857,566 A | 12/1974 | Lemelson et al. | 273/348.4 |
| 3,908,830 A | 9/1975 | Skrzelowski | 211/55 |
| 3,975,850 A | 8/1976 | Giaume | 40/125 H |
| 4,079,767 A | 3/1978 | Howard | |
| 4,113,251 A * | 9/1978 | Imes, Jr. | 273/348.4 |
| 4,275,520 A | 6/1981 | Appleton et al. | 40/605 |

(Continued)

FOREIGN PATENT DOCUMENTS

| CN | 1132618 A | 10/1996 |
|---|---|---|
| CN | 1182009 A | 5/1998 |

(Continued)

OTHER PUBLICATIONS

*Velcro USA Inc.*, Literature, "Veltexe® Brand Loop Laminates", pp. 4.

(Continued)

*Primary Examiner* — Mark A Osele

(74) *Attorney, Agent, or Firm* — Fish & Richardson P.C.

(57) ABSTRACT

Lightweight, hook-engageable materials capable of functioning as hook-engageable fasteners are treated and configured for use for economical and attractive displays and decorations. Laminates of the material with various substrates with associated printing are used to form visually attractive point of purchase, merchandise or trade show displays. Self-supporting or stable materials having lettering or designs on their surface are used to form banners or floor coverings. Non-woven materials with varied areal density of fibers perform those functions with particular economy. Low density knit fabrics are also useful according to broad features of the invention. Methods are shown to produce reinforced corrugated board and desirably laminated and printed materials having hook-engageable surfaces.

27 Claims, 29 Drawing Sheets

U.S. PATENT DOCUMENTS

| | | | | |
|---|---|---|---|---|
| 4,277,527 A | | 7/1981 | Duhl | 428/109 |
| 4,379,189 A | | 4/1983 | Platt | 428/89 |
| 4,591,526 A | | 5/1986 | Grant et al. | 428/198 |
| 4,649,069 A | | 3/1987 | Tone | |
| 4,734,298 A | * | 3/1988 | Kikukawa | 427/256 |
| 4,744,189 A | | 5/1988 | Wilson | |
| 4,761,318 A | | 8/1988 | Ott et al. | 428/85 |
| 4,763,798 A | | 8/1988 | Handler | 211/88 |
| 4,770,292 A | | 9/1988 | Handler | 220/23.4 |
| 4,780,349 A | | 10/1988 | Gieske et al. | 428/100 |
| 4,800,663 A | | 1/1989 | Zeigler | 40/610 |
| 4,810,546 A | | 3/1989 | McLaughlin | |
| 4,821,787 A | | 4/1989 | Swanson | 160/135 |
| 4,822,658 A | | 4/1989 | Pacione | |
| 4,840,339 A | | 6/1989 | Grogan | 248/205 |
| 4,854,037 A | | 8/1989 | DeSanto | 29/755 |
| 4,863,127 A | | 9/1989 | Handler | 248/205.2 |
| 4,879,854 A | | 11/1989 | Handler | 52/238.1 |
| 4,884,713 A | | 12/1989 | Handler | 220/23.4 |
| 4,884,988 A | | 12/1989 | McMurray | 446/115 |
| 4,891,897 A | | 1/1990 | Gieske et al. | 40/618 |
| 4,906,503 A | | 3/1990 | De La Cruz et al. | 428/81 |
| 4,923,848 A | | 5/1990 | Akada et al. | 503/227 |
| 4,931,343 A | * | 6/1990 | Becker et al. | 428/95 |
| 4,933,225 A | | 6/1990 | Abe | 438/157 |
| 4,973,326 A | * | 11/1990 | Wood et al. | 604/391 |
| 4,974,384 A | | 12/1990 | Pacione | |
| 4,997,452 A | | 3/1991 | Kovach et al. | 8/471 |
| 5,024,015 A | | 6/1991 | Quarles, Jr. | 40/605 |
| 5,042,221 A | | 8/1991 | Pacione | |
| 5,060,443 A | | 10/1991 | Pacione | |
| 5,065,922 A | | 11/1991 | Harris | 224/42.32 |
| 5,117,988 A | | 6/1992 | Daniels | 211/113 |
| 5,191,692 A | | 3/1993 | Pacione | |
| 5,224,895 A | | 7/1993 | Franz | 446/321 |
| 5,259,763 A | | 11/1993 | Wendel et al. | 434/150 |
| 5,290,622 A | | 3/1994 | Tanabe | 428/182 |
| 5,326,612 A | | 7/1994 | Coulait | 428/100 |
| 5,337,903 A | | 8/1994 | Wolcovitch et al. | 211/13 |
| 5,342,291 A | * | 8/1994 | Scholz et al. | 602/41 |
| 5,383,296 A | | 1/1995 | Vecchione et al. | 40/604 |
| 5,458,590 A | * | 10/1995 | Schleinz et al. | 604/361 |
| 5,482,755 A | | 1/1996 | Manning | 428/95 |
| 5,503,076 A | | 4/1996 | Yeo | |
| 5,518,795 A | | 5/1996 | Kennedy et al. | 428/100 |
| 5,522,165 A | | 6/1996 | Molla | 40/604 |
| 5,528,773 A | * | 6/1996 | Lowinger | 2/161.4 |
| 5,534,049 A | | 7/1996 | Wallstrom et al. | 106/22 R |
| 5,595,567 A | | 1/1997 | King et al. | 604/391 |
| 5,603,410 A | | 2/1997 | Kara | 206/769 |
| 5,603,504 A | | 2/1997 | Powell | 273/348.4 |
| 5,632,390 A | | 5/1997 | Podergois | 211/195 |
| 5,664,780 A | | 9/1997 | Bricker | 273/239 |
| 5,669,900 A | | 9/1997 | Bullwinkel et al. | 604/391 |
| 5,695,855 A | | 12/1997 | Yeo et al. | |
| 5,763,041 A | | 6/1998 | Leak et al. | 428/100 |
| 5,763,336 A | | 6/1998 | Jones et al. | 442/382 |
| 5,819,453 A | | 10/1998 | Eichert et al. | 40/411 |
| 5,836,095 A | | 11/1998 | Crowell | 40/299 |
| 5,836,097 A | | 11/1998 | Lewis et al. | 40/658 |
| 5,836,455 A | | 11/1998 | Connor et al. | 206/757 |
| 5,848,926 A | | 12/1998 | Jardetzky et al. | 446/85 |
| 5,888,607 A | * | 3/1999 | Seth et al. | 428/92 |
| 5,889,085 A | * | 3/1999 | Fukuda et al. | 523/161 |
| 5,891,547 A | | 4/1999 | Lawless | 428/92 |
| 5,989,678 A | * | 11/1999 | Jacobson | 428/100 |
| 6,010,387 A | | 1/2000 | Nemec et al. | 428/100 |
| 6,197,404 B1 | * | 3/2001 | Varona | 428/152 |
| 6,298,624 B1 | | 10/2001 | Pacione | |
| 6,306,477 B1 | | 10/2001 | Pacione | |
| 6,460,303 B1 | | 10/2002 | Pacione | |
| 6,642,160 B1 | * | 11/2003 | Takahashi | 442/336 |
| 6,910,353 B2 | * | 6/2005 | Sasser et al. | 66/191 |
| 2005/0181352 A1 | * | 8/2005 | Shephard et al. | 434/428 |
| 2010/0018984 A1 | * | 1/2010 | Solomon | 220/739 |

FOREIGN PATENT DOCUMENTS

| | | |
|---|---|---|
| DE | 7042708 | 3/1971 |
| DE | 42 28 597 | 3/1994 |
| EP | 0 341 993 | 11/1989 |
| EP | 0 862 868 | 9/1998 |
| EP | 0937420 A2 | 8/1999 |
| GB | 1546901 | 5/1979 |
| JP | 2-283305 * | 11/1990 |
| JP | 02283305 | 11/1990 |
| JP | 3-69658 * | 3/1991 |
| JP | 7-213310 * | 8/1995 |
| JP | 07213310 | 8/1995 |
| JP | 08259832 | 10/1996 |
| JP | 10-119415 * | 5/1998 |
| JP | 10119415 | 5/1998 |
| WO | WO 95/35056 | 12/1995 |
| WO | WO 96/19346 | 6/1996 |
| WO | WO 96/34741 | 11/1996 |
| WO | WO 98/33410 | 8/1998 |
| WO | WO 99/11452 | 3/1999 |
| WO | WO 99/12619 | 3/1999 |
| WO | WO 99/14047 | 3/1999 |
| WO | WO 9911452 | 3/1999 |
| WO | WO 99/22619 | 5/1999 |
| WO | WO 99/23905 | 5/1999 |

OTHER PUBLICATIONS

*Fire Box Association*, "Fibre Box Handbook" (excerpts); (1992); pp. 1-9, 108-112.

European Opposition Division, Brief Communication dated Aug. 26, 2009, with Letter from Opponent 01 of Aug. 17, 2009 (Response/documents D12-D20), 11 pages.

European Formalities Officer Tom Veldkamp, Decision Revoking the European Patent, 17 pages reasons for the decision, Wording of Articles 106-108 and Rules 97-98 EPC, and Minutes of the Oral Proceedings Before the Opposition Division, dated Oct. 14, 2009, 27 pages.

European Opposition Division, Summons to Attend Oral Proceedings, Mar. 26, 2009, 7 pages.

Letter in Response to the Summons to Attend Oral Proceeding, filed with the European Patent Office on Aug. 17, 2009, 10 pages.

Letter in Response to the Communication dated Jul. 5, 2005 and Nov. 21, 2005, filed with the European Patent Office on Jan. 5, 2006, 27 pages.

Notice of Opposition to a European Patent, Opposition against EP1194290B1 Velcro Industries B.V. By 3M Innovative Properties Company, May 24, 2005, 21 pages.

* cited by examiner

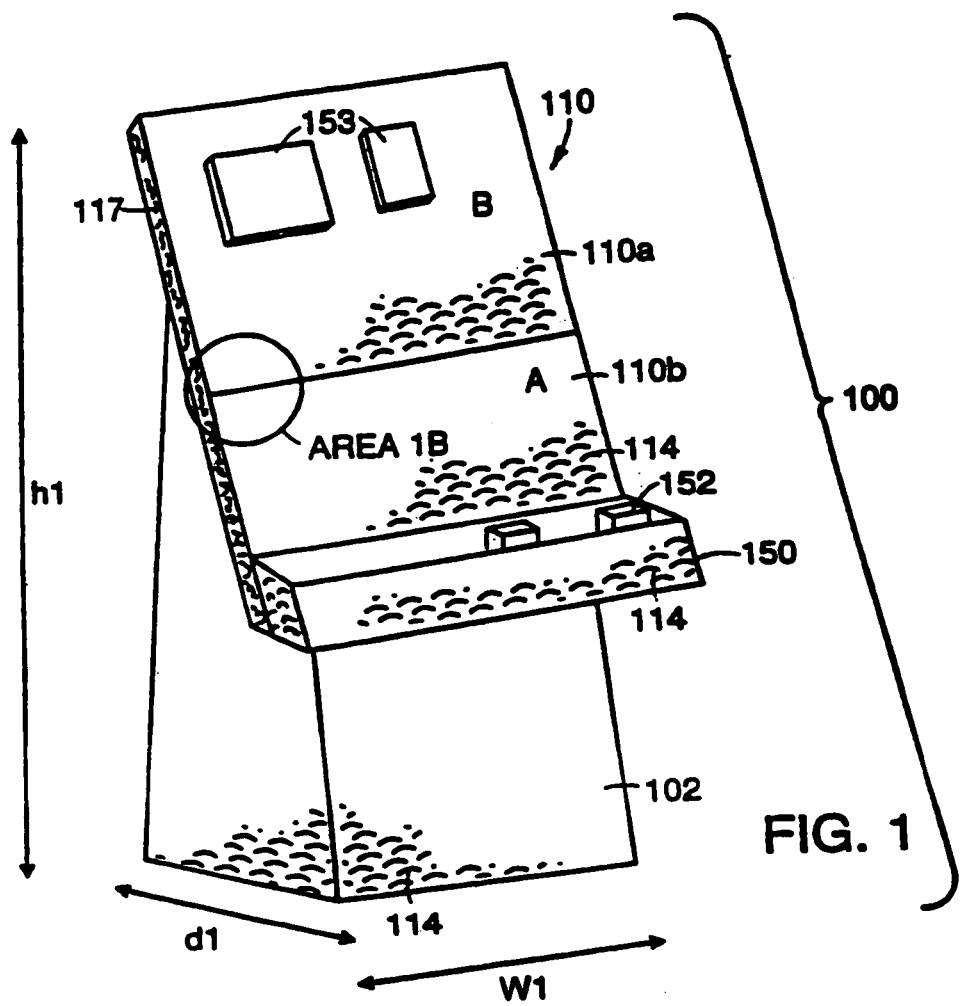
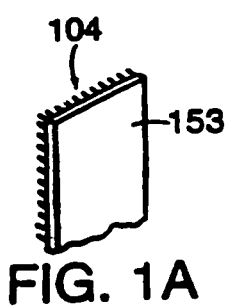
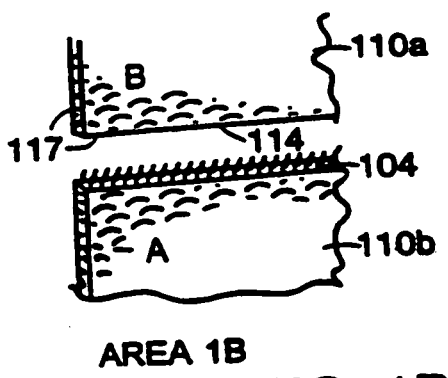

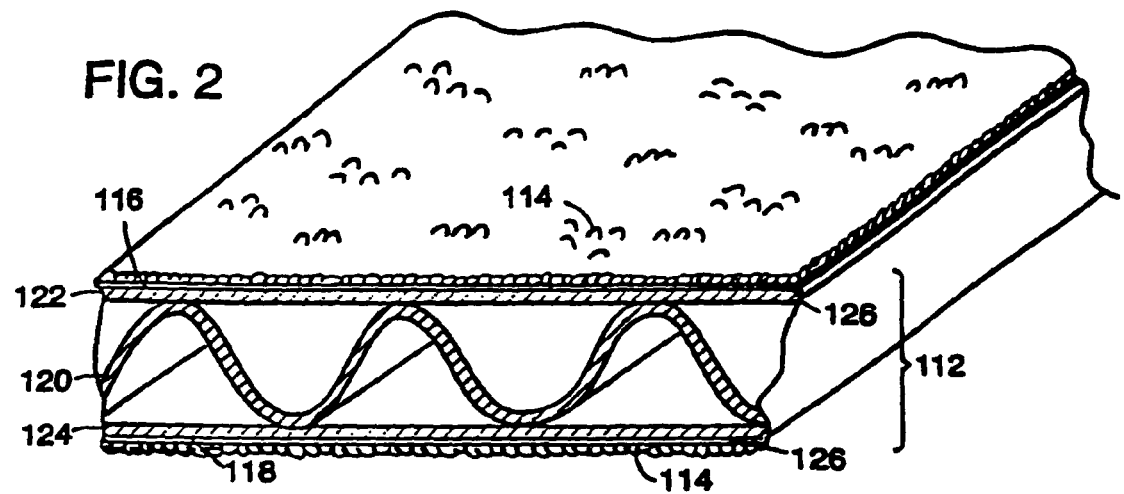
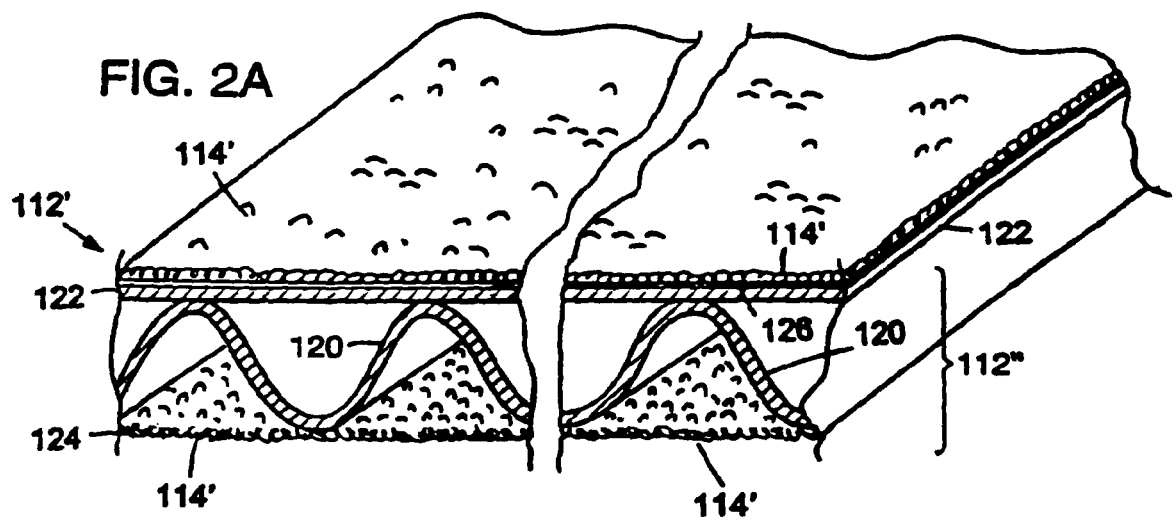

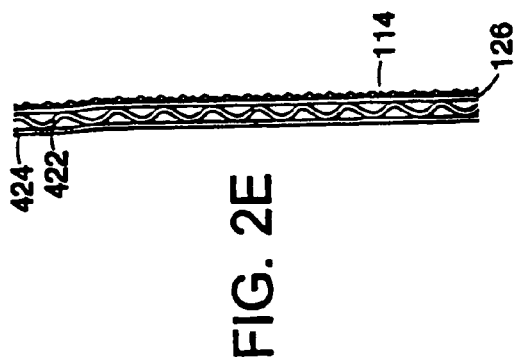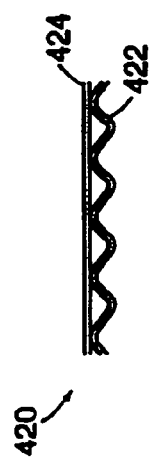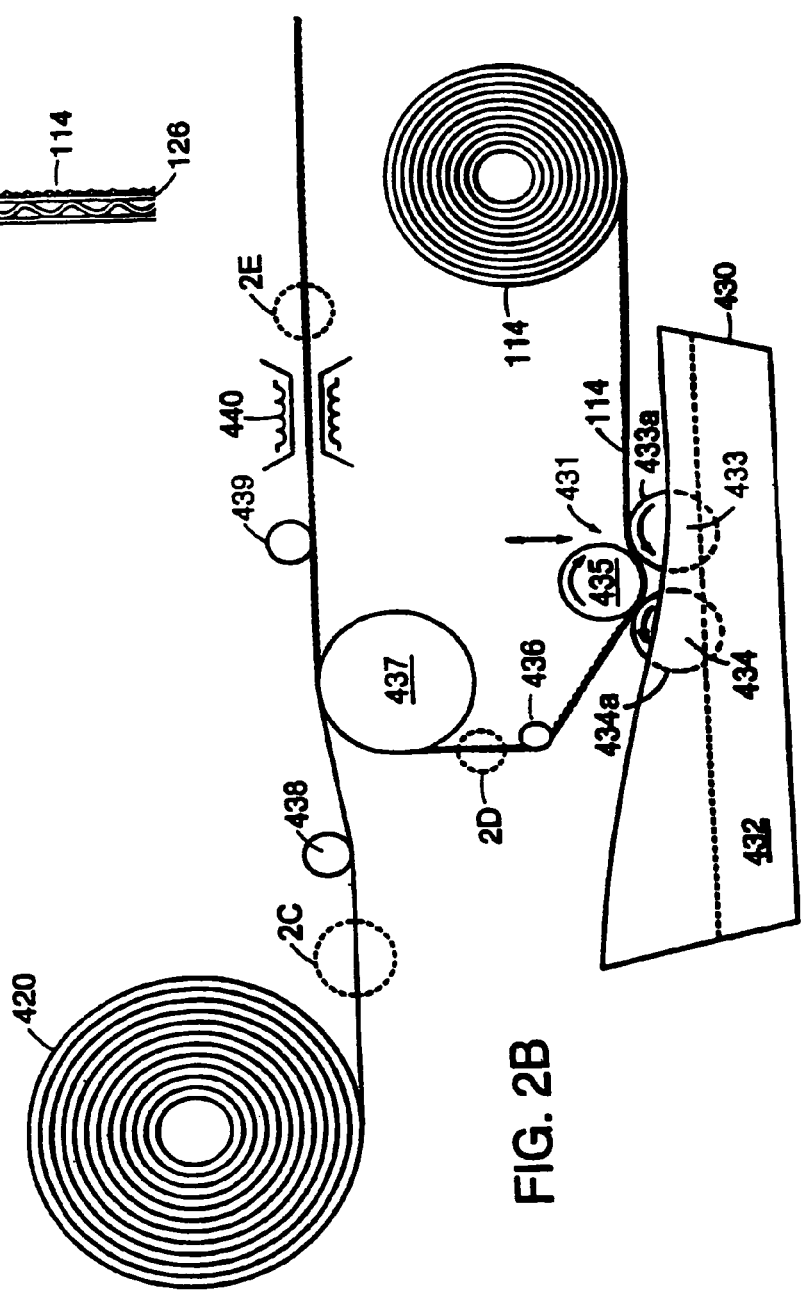

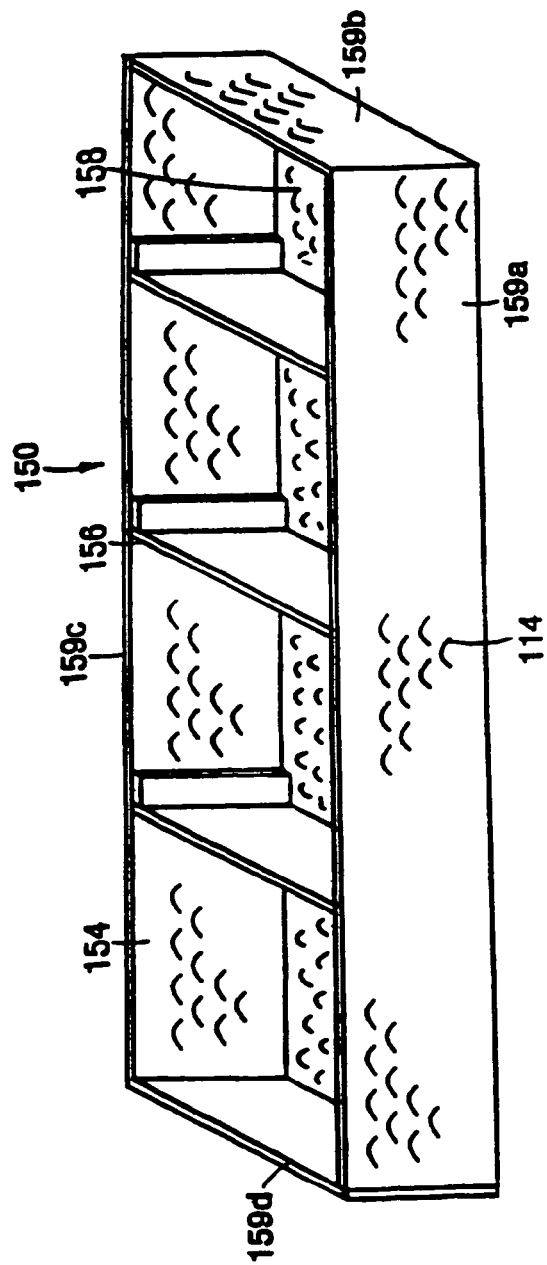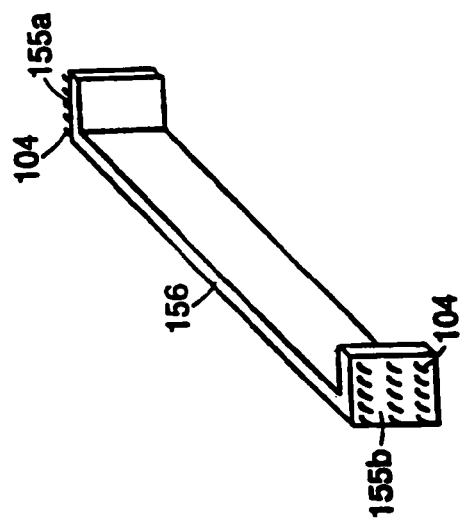
FIG. 4
FIG. 4A

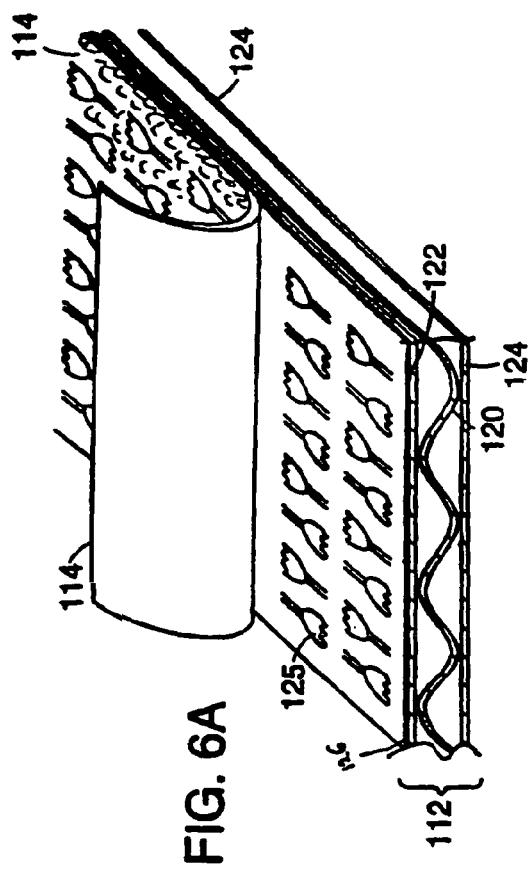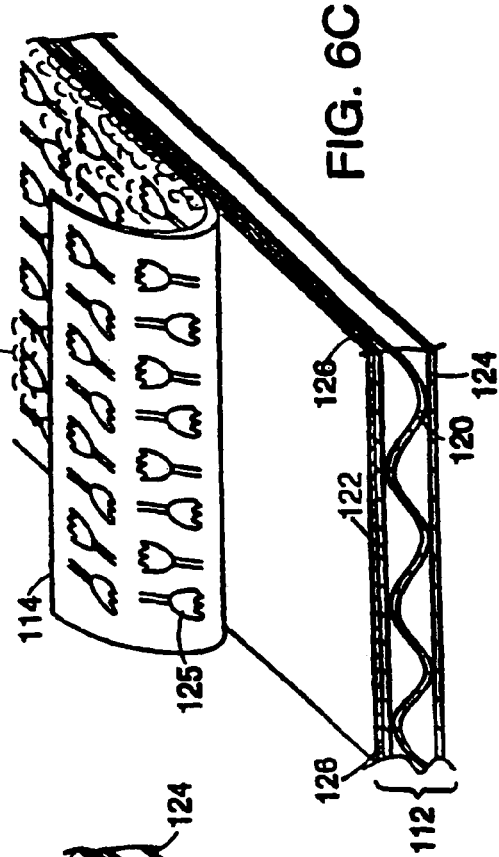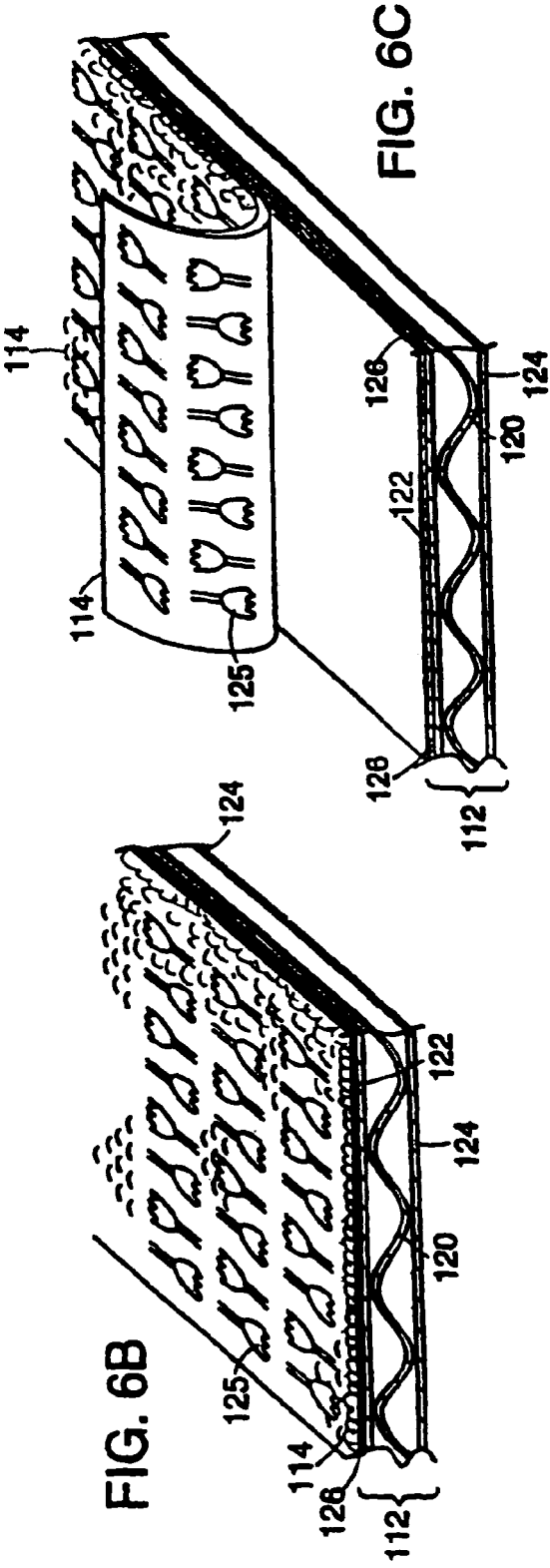

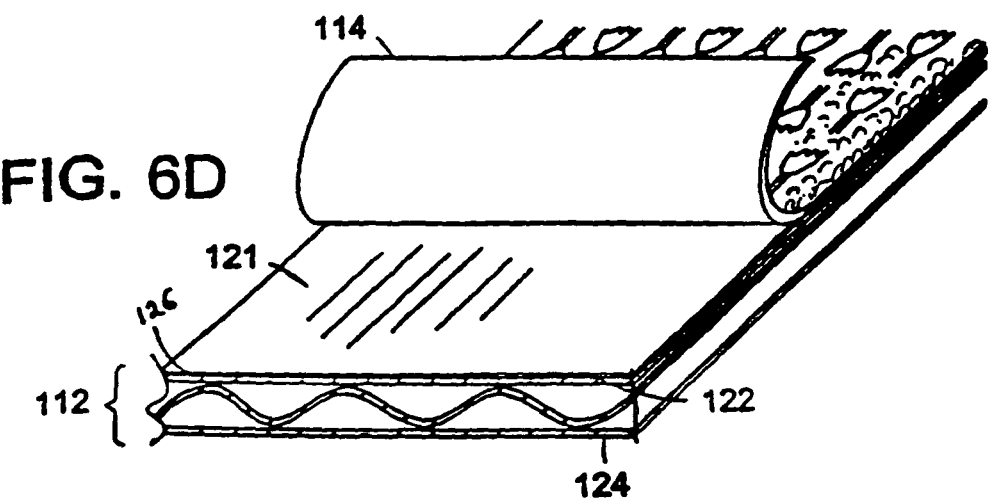

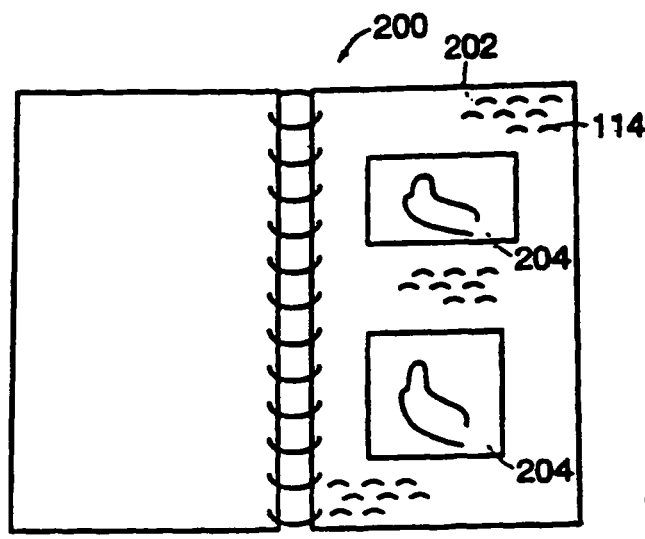
FIG. 8A
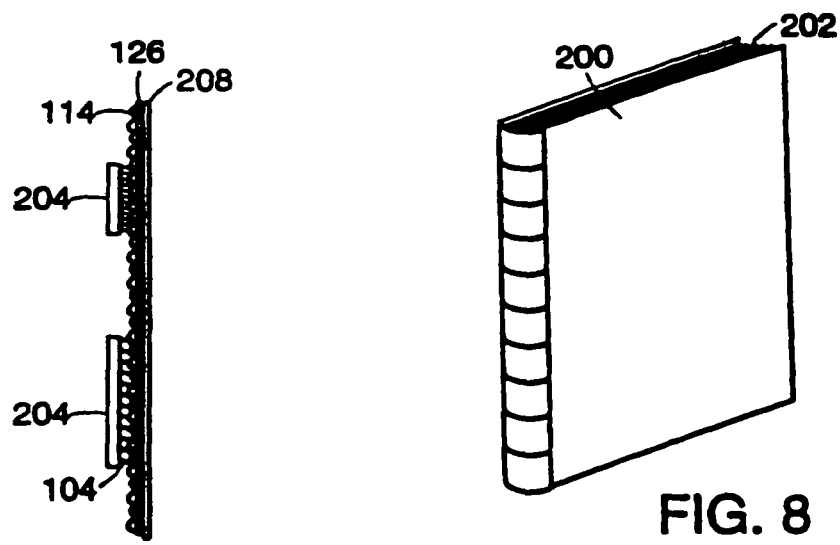
FIG. 8B
FIG. 8

HOOK-ENGAGEABLE FASTENER SHEETS, AND METHODS AND ARTICLES OF MANUFACTURE

CROSS-REFERENCE TO RELATED APPLICATIONS

This application is a continuation of U.S. Ser. No. 10/657,507, filed Sep. 8, 2003, now U.S. Pat. No. 7,160,600, which is a continuation of U.S. Ser. No. 09/322,663, filed May 28, 1999, now abandoned. The entire contents of these applications are incorporated herein by reference in their entirety.

BACKGROUND

This invention relates to visually stimulating, efficient and highly economical displays and decorations that employ detachable hook fastening, to novel materials useful for these and other purposes, and to methods of their manufacture.

Typical in-store marketing of products involves displaying the products in so-called "point of purchase" displays. These attract and focus attention of the customers, using stimulating graphic designs and colors in connection with presenting merchandise for easy access.

Typically the displays are custom-designed to display products of a given size and shape, which is more expensive than would be the case if the displays were capable of many uses.

There have been prior proposals to employ detachable hook fastenings in point of purchase displays as well as in other displays and decorations, but these have not gone into wide use because of various economic and functional limitations of the proposals.

There has been need for visually stimulating and attention-focusing displays and decorations, based on detachable fastening, which are versatile, effective, and low cost. Likewise there has been need for improved materials for fastening products and their methods of manufacture.

SUMMARY

Light-weight materials and in particular non-woven materials are found to be capable of functioning as hook-engageable fasteners while forming part of attractive displays and decorations. The products can be so low cost as to be disposable, and can be used or reused in many ways.

Knitted materials of corresponding light weight can be similarly effective in certain circumstances.

According to a first aspect of the invention, a laminate comprises a substrate having at least one broad surface to which is laminated a layer of light-weight hook-engageable material having a basis weight of less than about 4 ounces per square yard. The hook-engageable material has a generally sheet-form web body having a first surface laminated to the broad surface of the substrate and a second surface over which hook-engageable fibers or yarns generally extend.

Certain embodiments of this aspect of the invention have one or more of the following further features:

The hook-engageable material has a basis weight of about 2 ounces or less per square yard.

A binder resin anchors the hook-engageable fibers or yarns and constitutes between about 20 and 40 percent of the weight of the material.

The material comprises a stretched material, stabilized in its stretched condition.

The material comprises a non-woven material.

The areal density of the fibers of a hook-engageable non-woven material varies over its surface. In preferred embodiments areas of high areal density of fibers are interspersed with areas of substantially lower areal density of fibers, the ratio of high to low areal densities of fibers being at least four to one.

In other embodiments the hook-engageable material comprises a knit material in which yarns (including multi-filament yarns) form hook-engageable loops.

A graphic design is printed upon a surface of the laminate and disposed to be visible by viewing the surface of the low-density web body from which the hook-engageable fibers or yarns extend.

A graphic design at least partially comprises printing residing on the hook-engageable fibers or yarns of the hook-engageable material, or on the surface of the web body from which the hook-engageable fibers or yarns extend, or on the opposite surface of the web body, or on the outer broad surface of the substrate, or on combinations of these surfaces.

In cases in which at least part of the design lies below the web body of the hook-engageable material, the material is at least partially transparent such that the design can be seen through the material.

In the case of non-woven material that has substantially varied areal density of fibers over its surface, and an image is printed on the side of the material from which hook-engageable hooks extend, an image visible from the surface of the material comprises the effects of light reflected by printing on the second surface of the material and light reflected by the hook-engageable fibers that extend from the surface. These multiple levels of origination of visible rays contribute richness and depth to the composite visual image, e.g., giving the impression of high quality. The image of the printed graphic design comprises resolved features of the order of less than a few millimeters.

The laminate is disposable.

The substrate comprises a corrugated core. In preferred cases, the substrate is a smooth-sheet side of a corrugated board or the substrate comprises a corrugated core which is laminated at its spaced-apart flutes to the material.

At least part of the substrate is selected from the group consisting of paper, wood, synthetic foam, chipboard, wallboard, metal, plastic, and cork.

A merchandise display comprises at least one laminate according to this aspect of the invention combined with merchandise or decorative material having loop-engageable hooks. The hooks releasably secure the merchandise or decorative material to the hook-engageable fibers or yarns.

According to another aspect of the invention, a laminated composite is in the form of a corrugated board comprising a first outer layer, a second outer layer, and a core comprising at least one middle corrugated layer. The first and second outer layers are laminated to the core, and at least one of the outer layers comprises or is laminated to hook-engageable material having a generally sheet-form web body, the web body having an outer surface from which hook-engageable fibers or yarns extend.

In important embodiments of this aspect of the invention, the hook-engageable material is a material having a basis weight of less than about 4 ounces per square yard or even about 2 ounces or less per square yard.

Preferred embodiments of this aspect of the invention have one or more of the further features described above with respect to the first aspect of the invention.

According to other aspects of the invention, a display system, much as a trade show display or booth, or other display, comprises a set of laminated panels, preferably of corrugated board as described above, in which at least some of the panels are cooperatively constructed to be assembled as a self-supporting structure and/or in which the panels present hook-engageable loops for receiving decorations, displays or other objects.

In preferred embodiments, panels of corrugated board are configured to be joined with loop-engageable hooks engaged with fibers or yarns of the hook-engageable material to form self-supporting structures.

Preferred embodiments of these aspects have one or more of the features described above with respect to the first aspect of the invention.

According to another aspect of the invention a display comprises a continuous layer of hook-engageable material having a basis weight of less than about 4 ounces per square yard laminated to a substrate having a broad surface, the material comprising a generally sheet-form web body having hook-engageable fibers or yarns extending from an exposed surface, for releasable engagement by hook fasteners secured to the objects. Preferred embodiments have one or more of the further features described with respect to the first aspect of the invention described above. In certain preferred embodiments, the display is constructed and arranged to be suspended freely from a support and has dimensional stability sufficient to support the weight of objects, e.g. merchandise, secured to it without significant distortion of the display.

According to another aspect of the invention, a banner or flag comprises a dimensionally stable non-stretchable hook-engageable material shaped in the form of a banner or flag having a basis weight of less than about 4 ounces per square yard and comprising a generally sheet-form web body having hook-engageable fibers or yarns extending from at least a first exposed surface.

In certain preferred embodiments of a banner, flag, or another object formed of the material, a graphic design, e.g. lettering, insignia or a design resides upon a surface of the material in position to be visible by viewing the surface of the material from which the hook-engageable fibers or yarns extend.

In certain embodiments the graphic design, e.g. lettering, insignia or a design are printed upon a surface of the material.

In some embodiments the graphic design is defined by a discrete separable member having loop-engageable hooks that releasably secure the graphic design to the hook-engageable fibers or yarns of the material.

In certain preferred embodiments the material is at least partially transparent so that the design is visible from both surfaces of the material.

In certain embodiments the material is constructed to form a pendant banner or flag constructed to be releasably suspended from a support surface by engaging fibers or yarns of the material with hook fasteners, which, for example, are secured to the support surface.

Preferred embodiments of these aspects of the invention have one or more of the further features described above with respect to the material employed according to the first aspect of the invention.

According to another aspect of the invention, a method of forming a material useful in a display system comprises providing a sheet of a hook-engageable material having a basis weight of less than about 4 ounces per square yard and comprising a generally sheet-form web body having inner and outer oppositely directed surfaces, hook-engageable fibers extending from the outer surface, and laminating the inner surface of the material to a substrate. In certain embodiments, a graphic design is printed at least partially on at least one of the surfaces comprising the laminate, the characteristics of the material and printing selected such that the graphic design can be seen by viewing the outer surface of the material. Preferably the hook-engageable material is a non-woven having one or more of the characteristics that have been described above.

According to another aspect of the invention, a method of forming a material useful in a display system comprises providing a sheet of a hook-engageable non-woven material having a basis weight of less than about 4 ounces per square yard and comprising a generally sheet-form web body having first and second oppositely directed surfaces, hook-engageable fibers extending from at least one of said surfaces and printing a graphic design at least partially on one of the surfaces of the non-woven material.

In preferred embodiments, the non-woven material is a needled, stretched and stabilized non-woven material and/or the material is selected to be at least partially transparent such that design can be seen through the material.

In certain embodiments the printing step comprises flexographic printing, dye sublimation printing, electrostatic printing or ink-jet printing, and preferably in many cases then printing substances of those processes are applied to the hook-engageable side of the material without impairing the hook-engageability of the material.

In other cases screen printing with viscous inks can be employed on the side of the material opposite that from which hook-engageable fibers or yarns extend.

Preferred embodiments of these two method aspects of the invention employ selecting the materials, conditions and features described above with respect to the first aspect of the invention.

Various embodiments of the invention have one or more of the following advantages. The display systems can be lightweight, easily assembled and disassembled and not require any additional or heavy supporting frame. They can be versatile and disposable while still being low cost and visually attractive. In particular, these displays and other decorations can carry visually stimulating printing and decorations that can be easily replaced and rearranged. Modular panels can be easily assembled or rearranged. Because of these desirable properties the displays and decorations find applications for in-store marketing, trade shows and in many other circumstances where visually stimulating, inexpensive displays and decorations are needed.

In some embodiments, a binder is applied to a hook-engageable material (e.g., a needled and stretched non-woven) as a stable foam. By "stable foam" we mean that when cured the foam still contains a sufficient amount of entrained air bubbles to remain in continuous layer form on the material, rather than be dispersed to form separate coatings of individual fibers and interstices. When cured, the binder stabilizes the material in its stretched state and forms a thin, continuous film on the non-working side of the material. The film is useful for inhibiting adhesive permeation during subsequent lamination, or for supporting ink applied to the material from its working side. The stable foam film also provides advantageous resilience for hook engagement, and its bending stiffness and facial resilience are readily adjusted by binder formulation.

The hook-engageable surface on corrugated board or other laminate and/or printed products according to the invention provide a soft textile look, have significant marketing appeal, can contain rich colors and designs while providing attachment surfaces and flexibility for different designs and decorative arrangements, while still being inexpensive and disposable.

Other features and advantages of the invention will be apparent from the following description of embodiments, and from the claims.

DESCRIPTION OF DRAWINGS

FIG. 1 is a perspective view of a point of purchase display system.

FIG. 1A is a perspective view of a card attached to the display system of FIG. 1.

FIG. 1B is an exploded view of area 1B of FIG. 1.

FIG. 2 is a side cross-sectional perspective view of a corrugated board laminate combined with a fastening material outer layer.

FIG. 2A is a side cross-sectional, perspective view of an embodiment of a corrugated board in which the fastening material forms a face layer of the corrugated board itself.

FIG. 2B is a side view of a lamination apparatus.

FIG. 2C is a cross-sectional side view of a single faced corrugated board which may be fed to the laminating process.

FIG. 2D is a cross-sectional side view of a hook-engageable material coated with an adhesive layer fed to the laminating process.

FIG. 2E is a cross-sectional side view of a corrugated board laminate with a hook-engageable material outer layer produced by the lamination process.

FIG. 4 is a perspective view of a tray fabricated of the corrugated board of FIG. 2 or 2A.

FIG. 4A is a perspective view of a divider of the tray.

FIG. 6A is a diagrammatic perspective view of a corrugated board laminate having a non-woven hook-engageable material outer surface, in which a printed graphic design resides on the top surface of a top paper layer of the corrugated board to which the hook-engageable material is bonded.

FIG. 6B is a diagrammatic perspective view of a corrugated board laminate having a non-woven hook-engageable material outer surface, in which a printed graphic design resides on the hook-engageable surface of the material.

FIG. 6C is a diagrammatic perspective view of a corrugated board laminate having a non-woven hook-engageable material outer surface in which a printed graphic design resides on the back surface of the hook-engageable material.

FIG. 6D is a diagrammatic perspective view similar to FIG. 6B in which the laminated board carries a background color or decoration that cooperates with a printed graphic design on the hook-engageable surface of the non-woven material.

FIG. 8 is a schematic illustration of a scrap-book.

FIG. 8A is a schematic illustration of the scrap-book of FIG. 8 having pages composed of hook-engageable material.

FIG. 8B is a side view of a page of the scrap-book of FIG. 8A.

DETAILED DESCRIPTION

Figure 1C:
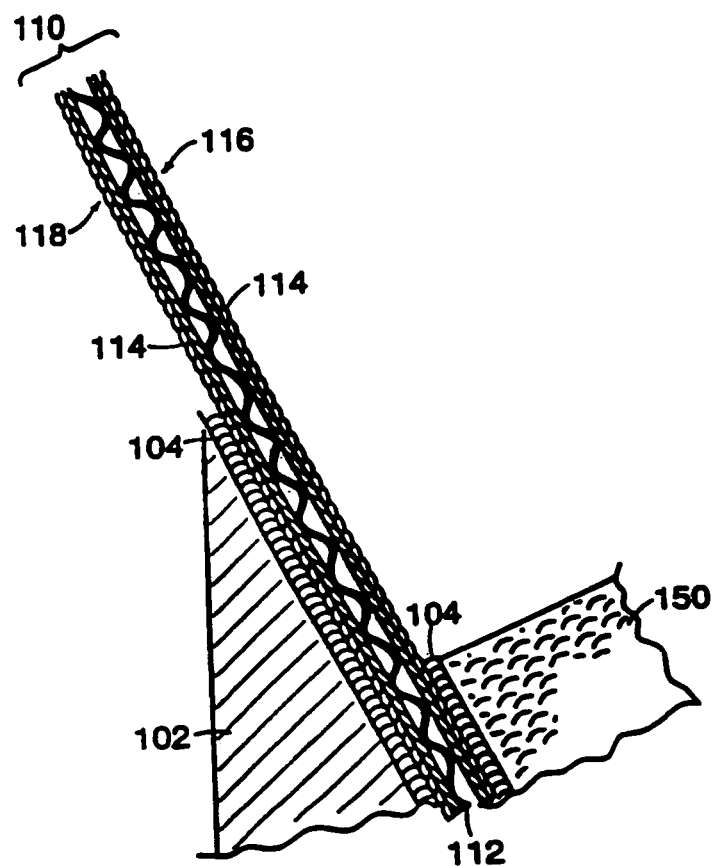
FIG. 1C is a partial side, cross-sectional view of the point of purchase display of FIG. 1.
Figure 1D:
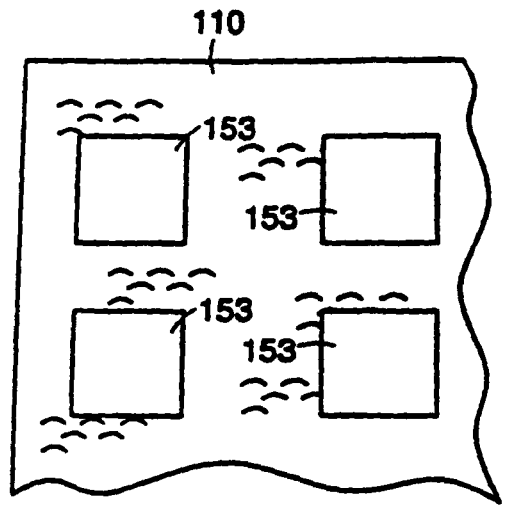
FIGS. 1D and 1E illustrate different card or product arrangements for the display system of FIG. 1.
Figure 1E:
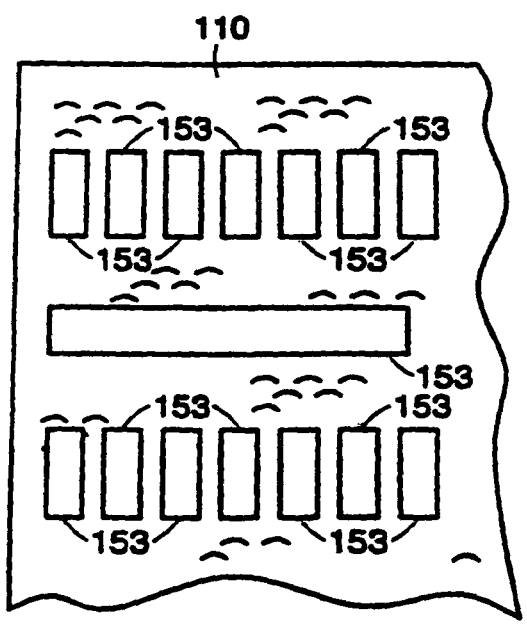

To effectively promote merchandise in a store, the goods may be placed in a point of purchase display located on the store shelves or aisles. The display customizes the promotion and marketing of the goods.

The invention features very inexpensive, light-weight, easily assembled, self-supporting attractive displays for displaying and promoting the merchandise with messages and designs.

Referring to FIG. 1, a self-supporting point of purchase display system 100 is comprised of corrugated board or the like having an outer lamination of light-weight, hook-engageable material defining its broad exposed surfaces. The display includes a base 102, a display board 110, and a display tray 150. The tray 150 holds products 152 and the entire display system 100 is placed in a store aisle or shelf. Cards 153 presenting sales promotion messages or carrying merchandise are attached to the display board 110 (FIG. 1A). In certain advantageous instances the display system 100 is configured by those skilled in the art as a carton for shipping the product to the store.

The board 110, the base 102, and the tray 150 are composed of corrugated board 112 illustrated in FIG. 1C. The corrugated board 112 includes (see FIG. 2) a corrugated core layer 120 sandwiched between and adhered to top and bottom paper outer layers, 122,124 or a corrugated board in which the hook-engageable material itself forms one or both of the outer layers of the board (FIG. 2A), described below. One or both of the broad outer surfaces of the top and bottom paper layers 116 and 118 (FIG. 1C), respectively, of the display board (FIG. 1) are continuously laminated to respective outer layers of hook-engageable light-weight material 114 by continuous adhesive layer 126. For example, layer 114 of FIG. 2 is a non-woven material or a knit material having a thickness of less than 0.100 inch and a basis weight of less than 4 ounces per square yard, in particularly preferred low cost embodiments of about 2 ounces per square yard or less, and, in the case of the paper-sided corrugated board to which material 114 is laminated is of single wall C-flute type with a Mullen's burst test in the range of between 125 lbs/sq. in and 350 lbs/sq. in. The resulting composites have enhanced burst strength, as well as enhanced tensile, compression and bending strength.

In preferred embodiments employing hook-engageable non-woven material 114, the material is a needled non-woven fabric which is very thin, i.e., 0.05 inch, of basis weight 2 ounces or less per square yard but still dimensionally stable, and has relatively free hook-engageable fibers that extend from at least one side of a continuous, tangled mat of fibers 170 (FIG. 3C) that form the body of the web. These fibers have loop-like portions available to be engaged by loop-engageable hooks, the portions of the fibers at both sides of their engageable portions being secured to the mat of fibers. In present, particularly preferred embodiments, (FIGS. 3A, 3B and 3C) the non-woven needled fabric comprises staple polyester yarns of between about 18 and 4 denier, preferably 6 denier. Following needling of a bat of these fibers, the product is stretched longitudinally and transversely, to increase its area in excess of 100 percent, as much as 150 percent or more from its as-needled condition, following which fibers in the web that engage each other are bonded or adhered together, so that the web has significant tensile strength and the hook-engageable portions of the fibers are well anchored, while remaining available to be engaged by fastener hooks.

Figure 3A:
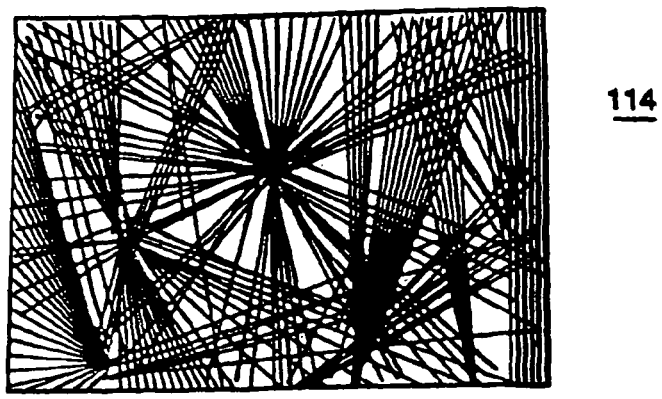
FIG. 3A is a schematic plan view of a preferred non-woven fastening material for use with a hook component.

In such a fabric the individual fibers of the mat 170 follow no definite pattern as in a woven or knit product, but extend in various directions within the plane of the fabric mat. The hook-engageable fibers that extend from the non-woven product are of the same fibers that comprise the mat but extend beyond the general mass of the mat 170, out of its plane, generally from associated knots 180, in the form of well anchored loop trees 250 (FIG. 3C). As depicted in the highly magnified plan view of FIG. 3A and the even more magnified view of FIG. 3B, the areal density of the fibers varies considerably, highest densities occurring at the knots and substantially lower densities in regions between the knots. In a preferred embodiment, the hook-engageable non-woven material, viewed in random areas of 1/8 inch square, knots as few as one or two or as many as 10 or 15 may be seen, the ratio of the high and low areal densities of such areas being generally at least four to one.

Figure 3B:
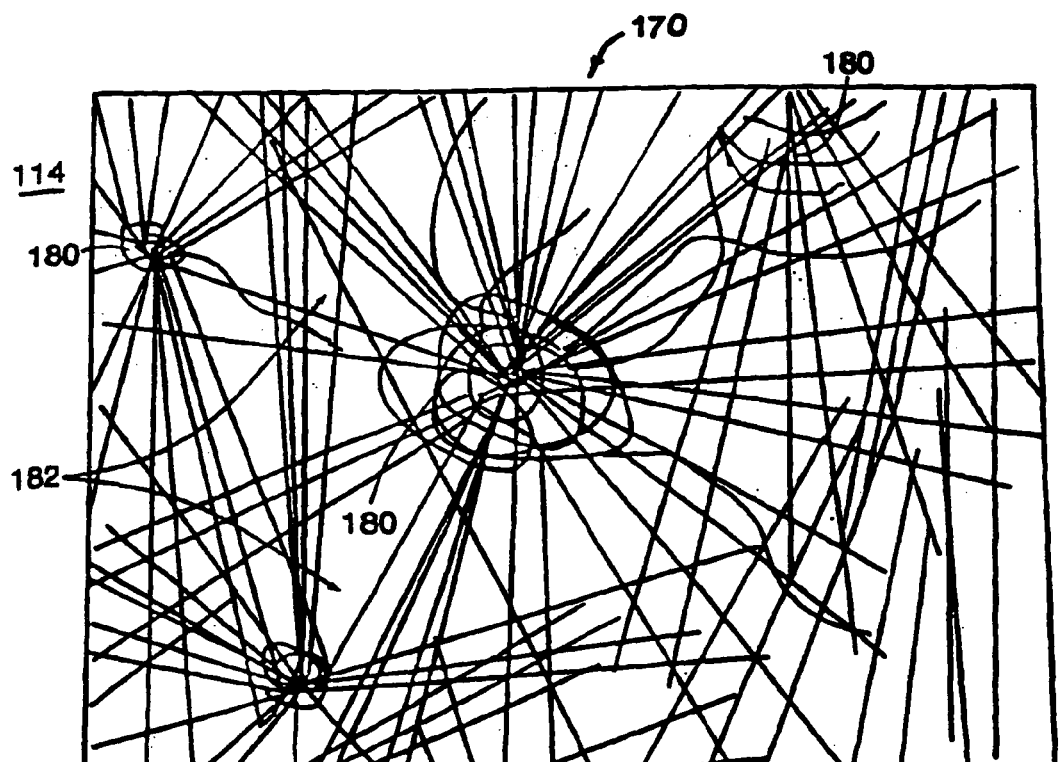
FIG. 3B is an enlarged schematic plan view of the face of the non-woven loop material shown in FIG. 3A.
Figure 3C:
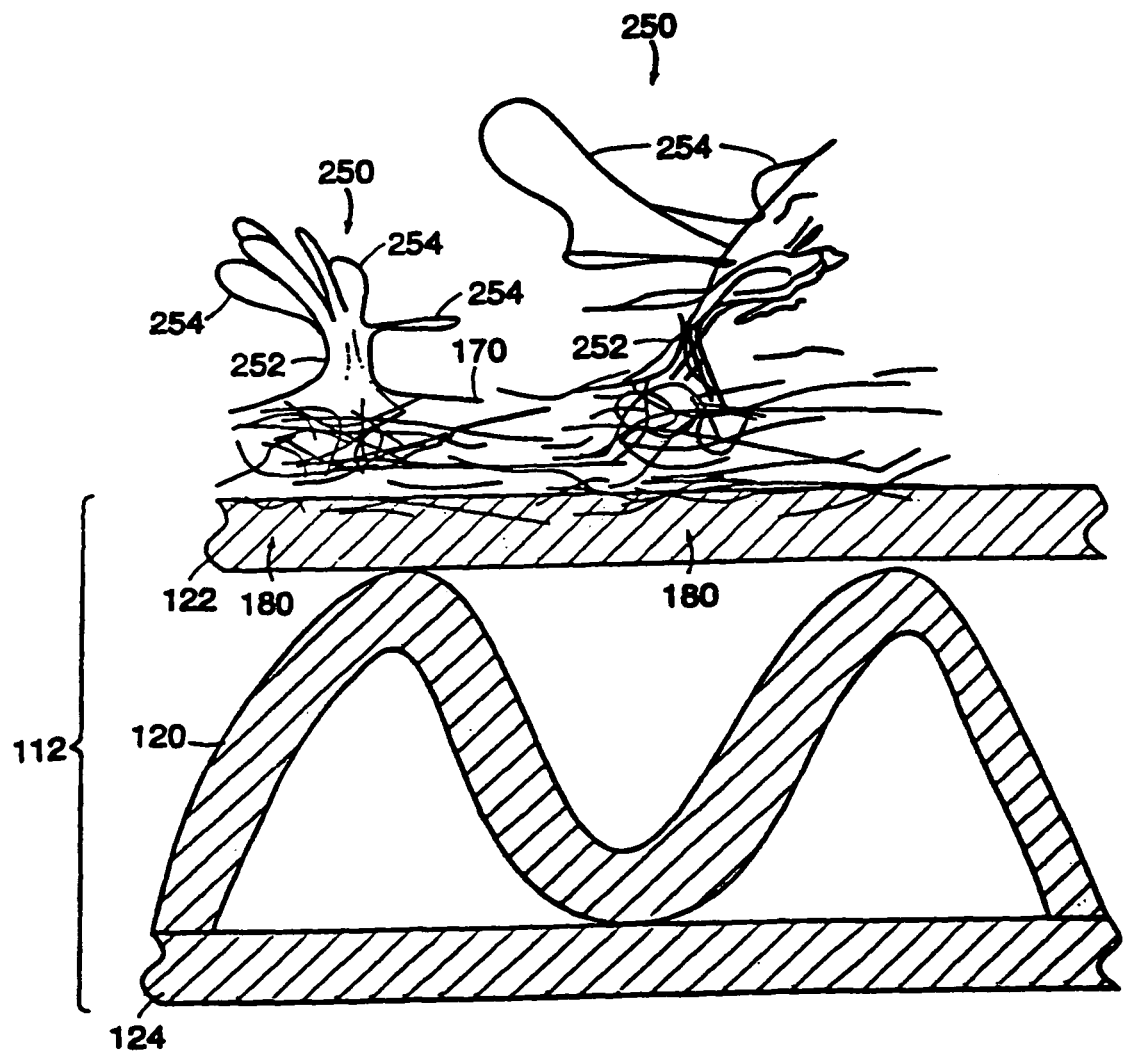
FIG. 3C is a diagrammatic side section sketch of non-woven material combined with corrugated board and illustrating clusters of hook-engageable fibers extending from a fibrous mat.

As shown in FIG. 3B, in the relatively low density fiber regions of a preferred mat, a substantial number of the fibers of the mat of non-woven material 114 are taut 182 (i.e., not slack, regionally straight), and extend between knots 180 of the non-woven material fabric. The taut fibers 182 have been straightened by tension applied in at least one direction in the plane of the fabric mat, while the knots have been produced by slippage and agglomeration caused during the application of stretching forces to the needled non-woven fabric.

The knot density may be approximately 180 knots per square inch, based on the number of visible knots within a given square area. With suitable stretching, the knots themselves are fairly tight, made up of several monofilament fibers, and are interconnected by the taut fibers seen running between them. The fiber mat is not very dense and the overall fabric in important instances is sheer enough to permit images or background designs or color to be seen through it, while, somewhat surprisingly, the fibers are present in sufficient density to enable a readily discernable image to be printed upon the fabric. In particular, using low viscosity printing inks the material may be printed on its hook-engageable side without impairing the hook-engageability of the protruding fibers, the image being printed partially on the hook-engageable fibers, that lie at various levels, and partially on the general mat body from which the hook-engageable fibers extend. For low cost applications, the non-woven fabric preferably weighs about 2 ounces or less per square yard, and still despite its considerable areal non-uniformity, can carry a pleasing image.

In a particular embodiment employing needling followed by stretching, the fibers of the mat are held in their taut, straightened condition by a water-based acrylic binder applied to the side of the mat opposite the loops to bind the mat fibers in their straight condition to stabilize the areal dimensions of the fabric, and to secure the loops at their associated knots, while contributing to the web body that can carry an image. The binder generally ranges between 20 and 40 percent of the total weight of the fabric and in the presently preferred embodiments accounts for about one third of the total weight of the non-woven component. The resulting fabric is dimensionally stable and strong enough to be suitable for further processing by standard fabric-handling techniques. While the fabric has a slight stiffness, like a starched felt, the stiffness can be mitigated where desired by softeners or mechanical working.

As seen in FIG. 3C, loops 254 extend from free-standing clusters 250 of loop fibers extending from the fibrous mat 170. The clusters 250 which have several mono-filament loops 254 extending from a common elongated, substantially vertical trunk 252 are called "loop trees". Each loop tree 250 extends from a corresponding knot 180 in which the loops of the cluster are anchored. Interstices between individual filaments in the trunk portion 252 of each tree or at the base of each bush, and in each knot 180 provide paths for the wicking of liquid binder, under the influence of surface tension of the liquid binder, to provide additional localized stiffness, strength and image-carrying capability. Importantly, the density of clusters in the plan view is very low, leaving sufficient room between the "branches" of neighboring trees to accommodate hooks and deflected non-woven material during engagement.

A description of suitable needled and stretched, hook-engageable non-woven materials is found in U.S. patent application Ser. No. 08/922,292, and a related PCT patent application entitled "Loop material, Its Manufacture and Its Use in Products", filed on Sep. 3, 1997, as a U.S. Continuation-In-Part of the foregoing application, published as WO 99/11452, the entire disclosures of which are incorporated by reference as if fully set forth herein.

In preferred embodiments of FIGS. 1 and 2 employing light-weight knit hook-engageable material, the material may be knit by conventional knitting techniques, e.g. to form a tricot knit, slit if desired, and stretched by appropriate tentering and stabilized by application of binder of the kind and percentage weights employed with the non-woven materials as described above. The stabilized knit material including its binder, preferably of weight less than 4 ounces per yard, in certain cases 2 ounces or less per yard, may be of gossamer appearance, substantially transparent but still capable of carrying a printed image and yarns (e.g. multifilament yarns) of the knit form hook-engageable loops.

In the embodiment of the left half of FIG. 2A, both the top and bottom layers of corrugated board 112' are layers of hook-engageable material 114' that is strong in tension, adhered directly in a pattern of parallel linear bond areas to the crests of corrugated central paper layer 120. In preferred embodiments the material 114' comprises needled, stretched and stabilized fabric, as described above. In one example, the paper comprising the corrugated core of the left half of FIG. 2A is a 26 lbs per 1,000 square feet paper, C-flute type, and each layer of hook-engageable material is a non-woven having a thickness in the range of 0.100 and 0.050 inch and a weight of less than 4 ounces per square yard, preferably 2 ounces or less per square yard. In other embodiments, knit layers of similar weight and dimension are employed.

In the embodiment of the right half of FIG. 2A, one side of the corrugated board 112" consists of non-woven material 114', adhered directly to the flutes of the corrugated core layer 120 as described above, and the other side consists of a layer of non-woven material 114' laminated to a layer of paper 122 which is bonded to crests of the flutes of the corrugated core 120.

Figure 2F:
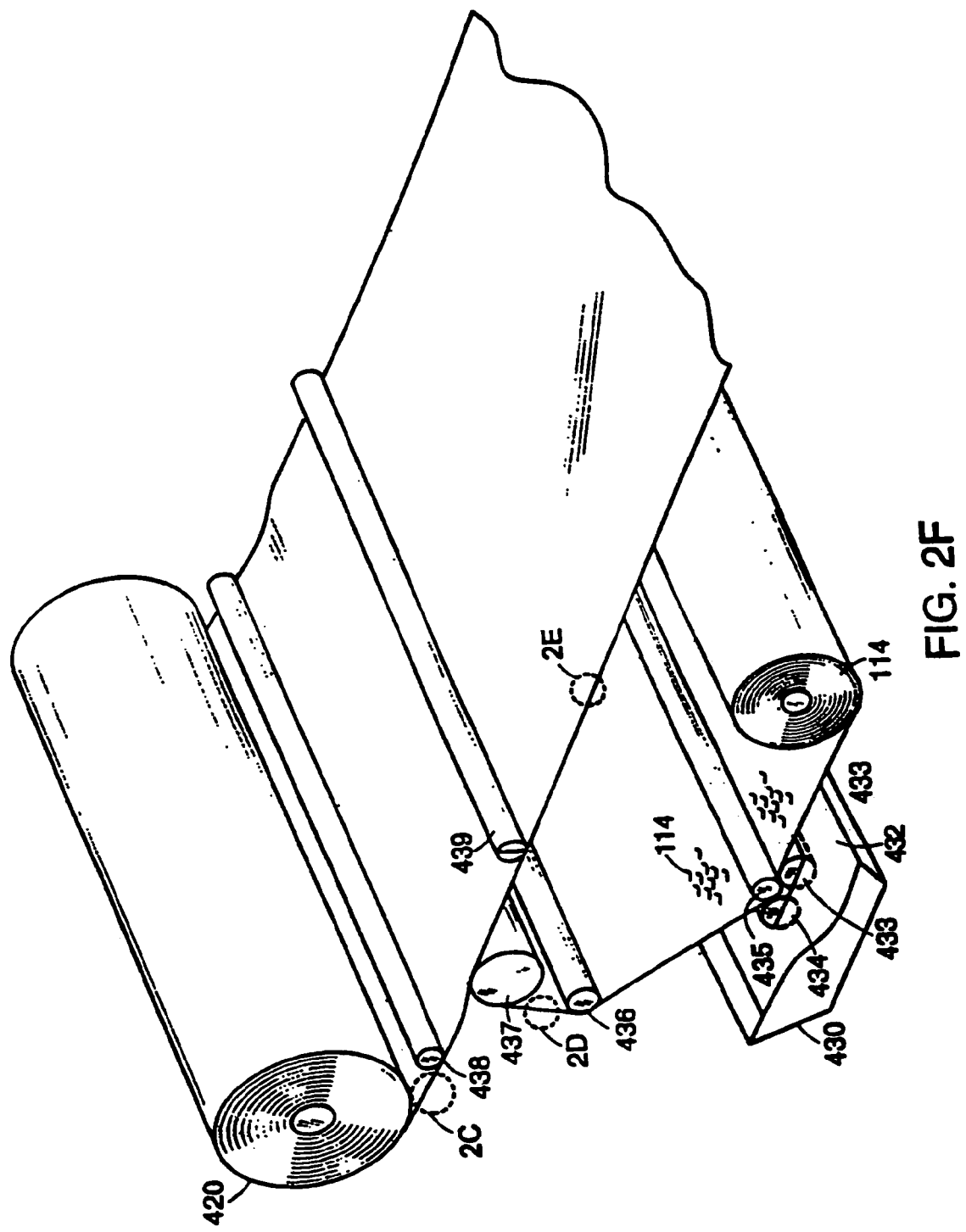
FIG. 2F is a perspective view of the lamination apparatus of FIG. 2B.

The laminated products of FIGS. 2 and 2A may be formed with the process shown in FIGS. 2B and 2F. Referring to FIGS. 2B and 2F, a light-weight hook-engageable material 114 having a web-base and hook-engageable fibers or yarns extending from the outside surface of the web-base is introduced into nip area 431 in which a pressure roll 435 forms one or more nips with adhesive-carrying rolls 433 and 434. The one or more rotating rolls 433 and 434 are partially immersed in an adhesive bath 430 and through their rotation they transfer adhesive 432 from the bath into the nip area 431. The material 114 enters the nip area 431 oriented so that the web-base opposite the hook-engageable fibers or yarns contacts the adhesive-carrying surfaces 433a, 434a of the rotating rolls 433, 434 and is coated with the adhesive 432. The material 114 is kept in contact with the adhesive-carrying surfaces 433a, 434a of the rotating rolls 433, 434, respectively, by rotating roll 435 without destroying the hook-engageability of the fibers or yarns. After coating, the material, led by guide roll 436, travels about roll 437, oriented so that its coated surface is exposed. Simultaneously a single faced corrugated board 420 (FIG. 2C) trained against the periphery of roll 437, contacts the exposed coated surface of the hook-engageable material 114 and is adhesively bonded to it. Tension rolls 438 and 439, arranged on either side of roll 437, press flutes 422 of the corrugated board 420 against the coated surface of the web. Subsequently, the corrugated board with the adhered hook-engageable layer (FIG. 2E) passes through a heater/dryer 440 where the adhesive is cured.

For forming the product of FIG. 2 the corrugated board 420 has a flat outer paper layer to which the hook-engageable material is continuously adhered, while for forming the product of FIG. 2A, the corrugated core is exposed for direct lamination with the material to which it is adhered in a series of closely-adjacent lamination bands, the pattern extending across the broad surface.

In some embodiments a stretched hook-engageable web without a binder coating is used to form the laminate. In such cases, the adhesive coating 126 serves the dual purpose of maintaining the stretched fibers or yarns in their taut, stabilized condition and adhering the web to the substrate.

While the hook engageable material 114 has been illustrated in FIGS. 2B-2F as being coated with a continuous adhesive layer 126 and laminated to the corrugated board 420 it may be that the corrugated board face layer 424 or flutes 422 of the corrugated core are coated with an adhesive and laminated to the hook-engageable material or adhesive may be applied to both sides of the layers to be joined.

Furthermore, while the hook engageable material has been illustrated in FIGS. 2 and 2A as being laminated on both sides of the corrugated board it may be provided on only one side, or selected regions of one or both sides, e.g., forming a label or continuous strip, in accordance with the particular needs for the product.

Other display substrates to which hook-engageable material may be laminated may be double or triple wall corrugated board of various flute types, paper, chipboard, foam of synthetic resin, wood, wallboard, metal, plastic, or cork sheet.

While continuous web processes have been illustrated batch or so-called "sheet" laminating (end printing) processes can be employed according to known techniques when low production volume so dictates.

Referring back to the embodiment of FIGS. 1 and 1C, the display board 110 is connected to the base 102, and the tray 150 is connected to the display board 110 by loop-engageable hook fasteners 104 that engage the fibers or yarns of the material 114 in the manner of disengageable hook and loop fastening. The fastening allows the display system to be assembled and disassembled with ease, by peeling action, while providing considerable strength under other modes of loading. This capability, combined with the overall light weight of the display components and the lack of a heavy frame make the display system flexible and easy to transport and set-up in stores or trade shows, while the relatively low cost of the materials enable the display to be disposable after use.

The specific design and layout of the display can be easily modified by adding new components or rearranging the existing components, to fit different articles for sale, and to receive different printed materials that are provided with hooks capable of detachable engagement with the light-weight hook-engageable material.

Figure 1F:
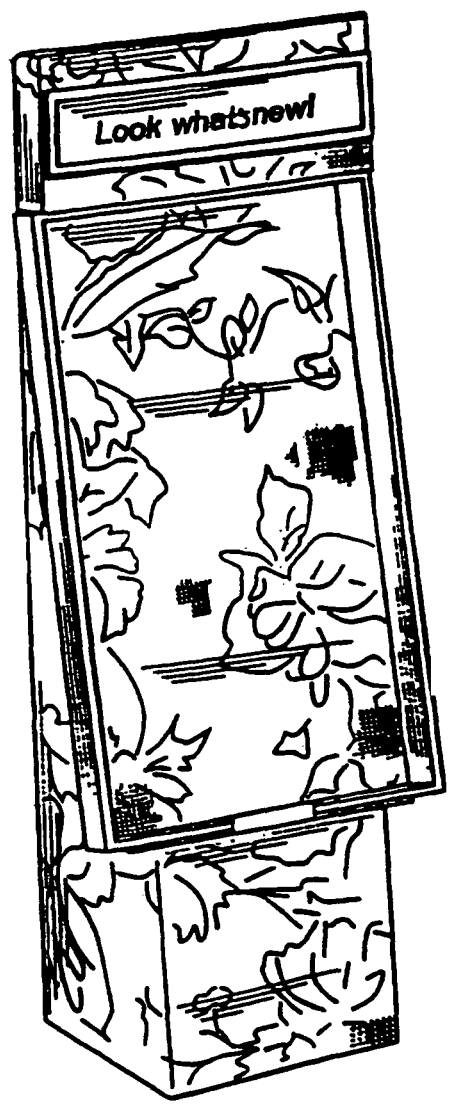
FIG. 1F is an illustration of a point of purchase display.
Figure 1G:
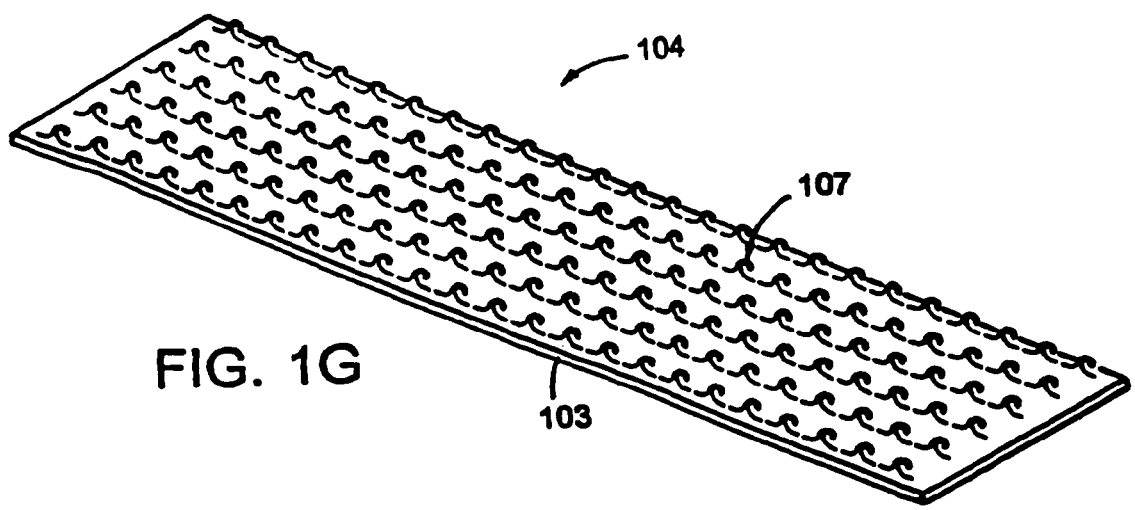
FIG. 1G is a diagrammatic perspective view of a hook fastener member.

Suitable loop-engageable hook fasteners 104 for engagement with the fiber or yarn-faced corrugated board have a base 103 and an array of fastener elements 107 integrally molded with the base, as shown in FIG. 1G. The hook fastener elements may be hook or mushroom shaped. Hook shaped fastener elements are molded according to the Fischer process, as described in U.S. Pat. No. 4,775,310, which is hereby incorporated by reference. For a hook-engageable material made from staple polyester fibers having a denier of 6, a suitable hook may be of the CFM-29 designation, available from Velcro USA Inc. of Manchester, N.H., U.S.A. Hook heights ranging from 0.015 inch to 0.030 inch are useful, with hook densities ranging from about 750 hooks per square inch to 1700 hooks per square inch.

The individual components of the display system may include one or more pieces connected also by hook and loop fastening. In the embodiment of FIG. 1, the display board 110 is made of two pieces, 110a and 110b, connected to each other by loop-engageable hook fasteners 104 engaging light-weight hook-engageable material 114 extending over the edge surface 117, see FIG. 1B.

Merchandise, e.g., on cards 153, are attached to the display board 110 by loop-engageable hook fasteners 104. The cards have various sizes and can be easily arranged and rearranged to form space-efficient displays on the same display board 110, as suggested in FIGS. 1D and 1E.

Referring to FIG. 4, the display tray 150 formed of corrugated board having an interior exposed layer of hook-engageable material, as previously described, is divided into different compartments 154 by removable dividers 156. Products and display items (shown in FIG. 1) are placed in the separate compartments. The dividers 156, composed of corrugated board, have hook fasteners 104 attached to end surfaces 155*a*, 155*b* (FIG. 4A). The hook fasteners 104 engage the fibers or yarns of layer 114 of the tray to attach the divider to the tray at selected locations enabling the design of the tray configuration to be easily modified. In one example, an aisle display according to FIG. 1 has a height $h_1$ up to 5½ feet, a depth $d_1$ of 40 inches and a width $w_1$ of 48 inches, corresponding in depth and width to the dimensions of a standard pallet. A shelf mountable display system has a height of 18 inch, a width of 24 inch, and a depth of 18 inch.

The display structure can be easily modified, either in the course of manufacture of displays or in the field by adding trays, additional panels, other display modules or by rearranging the panels and modules to form a totally different structure. This process of rearranging and forming various display structures reduces the amount of tooling used in die cutting additional structures and in required inventory.

Figure 5:
FIG. 5 is an illustration of a printed non-woven hook-engageable material depicting an animal character.

The surface of the light-weight hook-engageable material can be decorated with a graphic design, as shown in FIGS. 5 and 1F. The term "graphic design" is defined to include designs, pictures, lettering, insignia, indicia, directional signs, symbols and numbers.

Figure 5A:
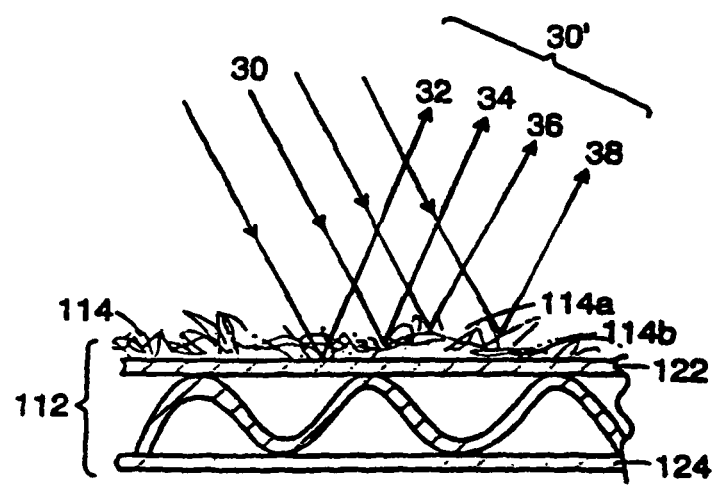
FIG. 5A is diagrammatic view of light rays reflected by the printed laminate of FIG. 2.

Referring to FIGS. 5 and 5A, a color-rich design of a deer is printed on the back side 114*b* of a non-woven material 114 formed in accordance with the description of FIGS. 3A, B and C and is viewed from the front hook-engageable side 114*a* of the non-woven material. The fibrous texture of the non-woven material disperses or scatters the incoming light 30 and the dispersed reflected light 30' provides a 'soft' textile image of the design. As shown in FIG. 5A, the image of FIG. 5 is composed of light reflected from the back side of the non-woven 34, light reflected from the hook-engageable fiber side of the non-woven 36, light reflected from the individual fibers 38 constituting the interior mass of the non-woven and light reflected by the substrate 32, some of the rays being multiply reflected before reaching the eye of the viewer. Advantageously, when printing the non-woven materials that have been described, having varied areal fiber density, and having hook-engageable fibers, as well as the fibers constituting the general matt situated at many different levels (unlike the usual knits), portions of the printed image are carried at the various fiber levels, and produce a unique soft and three dimensional effect that belies the low cost of the printed material.

Despite the "sheerness" or transparency of the preferred low density non-woven material (less than 4 ounces per square yard, preferably in many cases, about 2 ounces per square yard or less, even "gossamer"-like), as well as the varied density of the fibers over the surface of the material, it is thus found that pleasing images of sufficient resolution for near-viewing can be printed on the front or back surface of the non-woven material and viewed from the front surface. A degree of transparency of the material enables viewing from the front side of back-printed images, or images or background colors on a supporting substrate.

The interference between and cooperative effect of all reflected light rays creates images which have highly resolved detailed small features, e.g., millimeter-long fine hair of the deer fur, while providing a diffuse background that contributes to the attractive, 'soft' textile look. In the particular case of the deer design of FIG. 5 it has provided a realistic reproduction of the deer fur. The novel soft textile look, as opposed to a shiny, harsh or hard, printed paper surface, can be attractive for displaying cosmetics, perfume, clothing, accessories to clothing, and jewelry, among others.

Desirable visual effects are obtainable with gossamer like knit materials obtainable e.g. from Guilford Mills of Guilford, N.H., and prepared according to the techniques described above. Other sources of light-weight knit materials include Tybor, of Spain, Mizard, of Italy, and Applix, of France.

The visual effects described are obtained to varying selectable degrees depending upon the starting material, the location of the printed design, the side from which it is viewed and the printing method.

Referring to FIG. 6A, a graphic design 125 is printed on the top paper layer 122 of the corrugated board 112 upon which the hook-engageable material 114 is laminated. The paper layer 122 is either preprinted and then adhered to the corrugated layer 120 or it is printed after it has been adhered to the corrugated layer 120. Depending upon its selected weight the hook-engageable material 114, even if it is a non-woven with significant areal density variation, can be sufficiently transparent so that the print design 125 is visible through the fabric with a soft and pleasing textile look. A clear uniform layer of an adhesive 126 maximizes the contact between the printed paper 122 and the material 114 and contributes to the formation of the clear visible image. This arrangement is suitable for graphics that are fully colored and have very few details. In some cases the constituent fibers of the hook-engageable material may be transparent, to enhance color transmission; in other cases the constituent fibers may contain a pigment, for instance, white titanium dioxide to achieve a translucent, diffused or pastel effect.

Referring to FIGS. 6B, and 6C, a printed graphic design 125 is provided on the top and on the bottom surface of the hook-engageable material 114, respectively, and the material is laminated to the top paper layer 122 of corrugated board, as illustrated in FIG. 2, or material 114 itself serves as the "skin" of corrugated structure as illustrated in FIG. 2A. As noted above, although the material may be substantially transparent due to the low density of fibers in the material, still they are present in sufficient density to receive the printed substance and present a coherent image (as well as substantially enhancing the strength of the composite).

Printing or other visual effects provided on more than one surface can cooperate to provide the total visual effect. This is illustrated in FIG. 6D in which the surface of a supporting substrate 122 is printed or otherwise treated to have a desired background color 121, and a superimposed image 125 is provided on a surface of the light-weight hook-engageable material 114, in the case of FIG. 6D on the front surface of the material. The resultant perceived image includes the combined effect of the printed image on the material 114 and the background provided by the supporting substrate. For instance a white substrate can enhance the whiteness of white printed areas and can show through in regions of less dense printing much in the nature achievable employing "impressionistic" or "puntalistic" art techniques or as used in water color painting, or to create pastel effects.

The graphic design, including solid colors, is preferably printed on a surface of the hook-engageable material 114 or on the corrugated board or other supporting substrates by flexography or dye sublimation techniques. Other techniques may also be employed, including electrostatic and ink-jet printing.

Figure 6E:
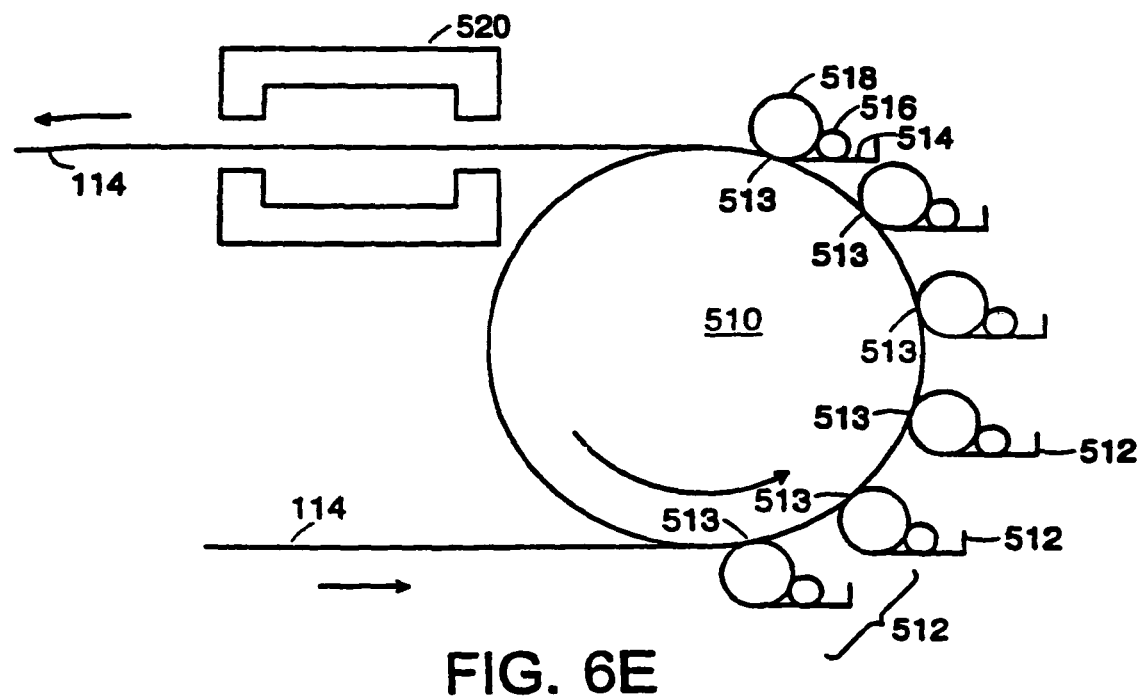
FIG. 6E is a diagrammatic side view of a "center impression" flexographic printing press used in producing the products of FIGS. 6A-6D.

Flexographic printing on a substrate includes applying a low viscosity flexographic ink or dye to a substrate and subjecting the applied ink or dye to conditions sufficient to fix the print onto the substrate. There are a number of types of printing presses used for flexographic printing, e.g. a "center impression" press, a "stacked" press, and an "in line" press, which can be configured to print between 1 and 8 or more colors. Referring to FIG. 6E, a six color "center impression" flexography press includes a rotating platen cylinder 510 and six color stations 512 arranged about the periphery of the platen cylinder 510 and driven by the periphery of the platen cylinder 510. Each color station 512 includes a rotating plate roller 518, a rotating ink roller 516 and an ink fountain 514. The ink roller 516 picks up the ink from the ink fountain 514 and transfers it to the raised surface portions of the plate roller 518. The surface of the plate roller 518 is composed of rubber or photopolymer and contains the mirror image of the print design for the respective color. The hook-engageable web 114 travels about the periphery of the plate cylinder 510, running through consecutive nips 513 formed between the plate rollers 518 and the platen cylinder 510 at each color station 512. The rubber surface of the plate roller 518 is pressed against a surface of the web 114 and the print design is transferred onto its surface. A different color is added at each station. In some cases, a third rotating roller (not shown) is used to transfer the ink from the ink roller to the plate roller 518. This three roller color station has the advantage of more even ink transfer and reducing the amount of fiber that may be transferred from the surface of one segment of the web 114 into the ink fountain that can contaminate the ink fountain.

In some embodiments, the platen cylinder 510 may be heated to slightly higher than room temperature, about 100 degrees Fahrenheit. After printing, the web 114 is subjected to conditions sufficient to fix the print design. For certain type of inks or dyes, fixation of the printing occurs at room temperature after several hours, e.g., 72 hours, or it may be accelerated by increasing the temperature, e.g., to 120 degrees Fahrenheit. Other type of inks or dyes require elevated temperatures for the fixation process, e.g., 200 degrees Fahrenheit. In cases when higher than room temperatures are used for the fixation process the web 114 passes through a heater 520. For fixation temperatures that are high enough to cause softening of the web a tenter frame (not shown) is used to avoid shrinking of the web during fixation.

Figure 6F:
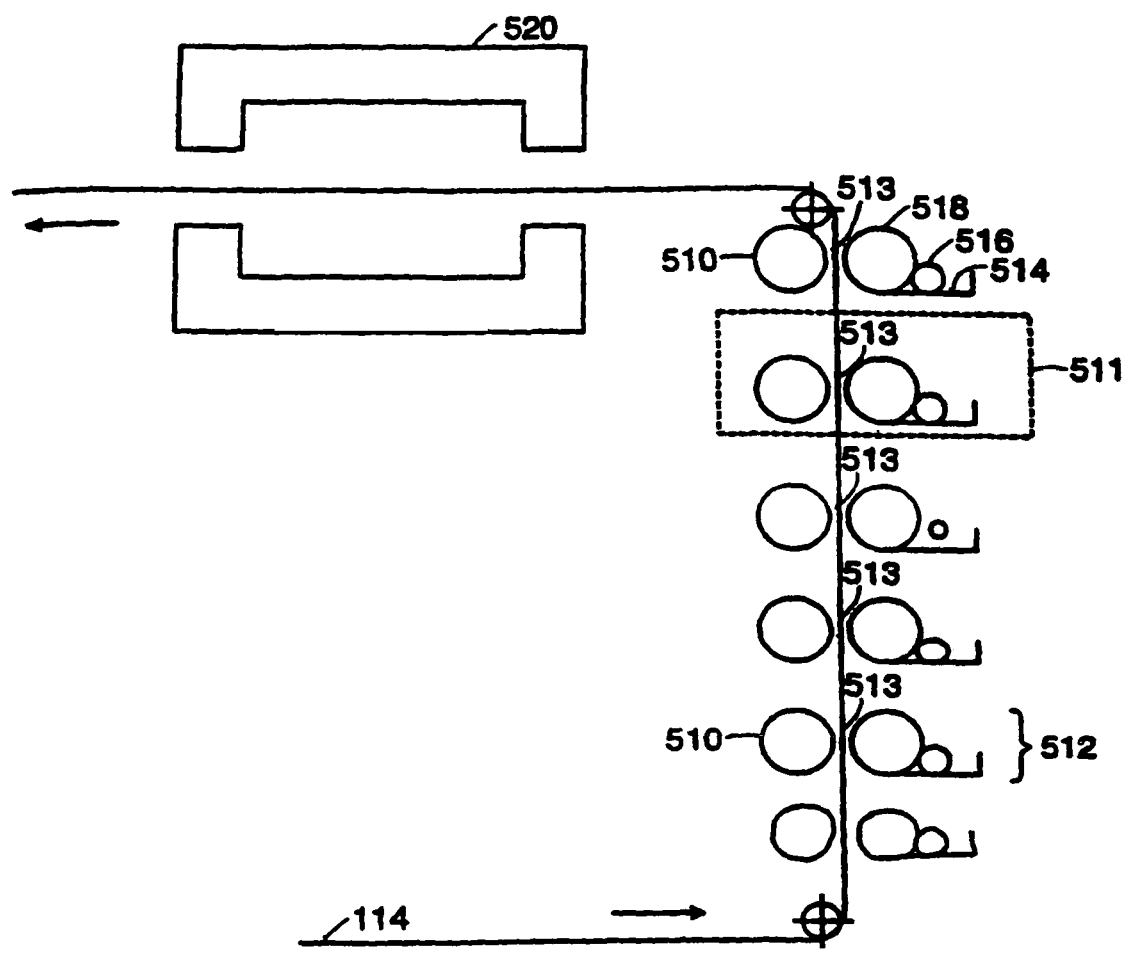
FIG. 6F is a diagrammatic side view of a "stacked" flexographic printing press used in producing the products of FIGS. 6A-6D.

Referring to FIG. 6F, a six color flexography "stacked press" includes six consecutive stations 511, each station including a color station 512 and a rotating platen cylinder 510. Each color station 512 includes a rotating plate roller 518, a rotating ink roller 516 and an ink fountain 514. As was described above, the ink roller 512 picks up the ink from the ink fountain 514 and transfers it to the raised portions of the surface of the plate roller 518. As was described above, in some cases, a third rotating roller (not shown) is used to transfer the ink from the ink roller 516 onto the plate roller 518. The surface of each plate roller 518 is composed of rubber or photopolymer and contains the mirror image of the print design for the respective color. The hook-engageable web 114 is introduced into nips 513 formed between each plate roller 518 and each platen cylinder 510 where the plate roller 518 is pressed onto a surface of the web to transfer the print design. A different color is added at each station. The individual platen cylinders 510 may be kept at slightly higher than room temperature, about 100 degrees Fahrenheit. As was described above, when higher than room temperatures are used for the fixation process the web passes through a heater 520 and for temperatures that are high enough to cause softening of the web a tenter frame is used to avoid shrinking of the web.

Many useful printing inks for such flexography comprise a solvent, a colorant, a binder, and other additives. Typical solvents are water, alcohols, ethers and mixtures thereof. Colorants are dyes, solid pigments and mixtures thereof. The solid pigment content of the inks ranges between 25 to 45 percent. Dyes are dispersed in the solvent solution and their content ranges between 5 and 13 percent. Inks with low solid pigment and/or dispersed dye content are used for pastel colors and inks with high pigment and/or dye content are used for the darker colors. The solid pigment and/or dispersed dye content depends also upon the specific artwork laydown. Heavy artwork laydown uses a higher amount of solid pigment and dye than light artwork laydown. In one example, for a 12 gram per square meter dispersed dye artwork laydown the dye content ranges between 5 and 13 percent.

Inks with low solid pigment and dispersed dye content have the advantage that they do not clog the surface or impair the function of the hook-engageable fibers or yarns and still produce attractive images.

In cases where the hook-engageable material is desired to be relatively thick, even thicker than that preferred for lightweight advantages, or where variability of its thickness and optical quality is detrimental to desired image quality, printing on the hook-engageable outer surface of the material is preferred. To achieve desired printed image quality while avoiding impairment of the hook-engageable property of the surface of the material, two step processes are employed, shown in FIGS. 6E and 6F. The flexographic ink or dye is first applied to the hook-engageable surface of the material 114 with a flexible printing plate, having a durometer of between 35 and 70, with minimal printing pressure at room temperature or at least at relatively low temperature, such that the synthetic fibers of the material 114 and its binder remain resilient when compressed under the printing plate, and the fibers or yarns substantially recover their hook-engageable orientation when printing pressure is relieved. Following such printing, after printing pressure has been removed, the hook-engageable surface of the material is subjected to elevated temperature to fix the printing, as by passing the back side of the material over a heated, rotating roll, or the material is exposed to a flow of heated air. Since no pressure is applied against the hook-engageable fibers or yarns simultaneously with heat during the fixation step, they maintain their hook-engaging ability, while a relatively high quality printed image is obtained. Such flexographic printing is fast, suitable for large volume applications.

Figure 6G:
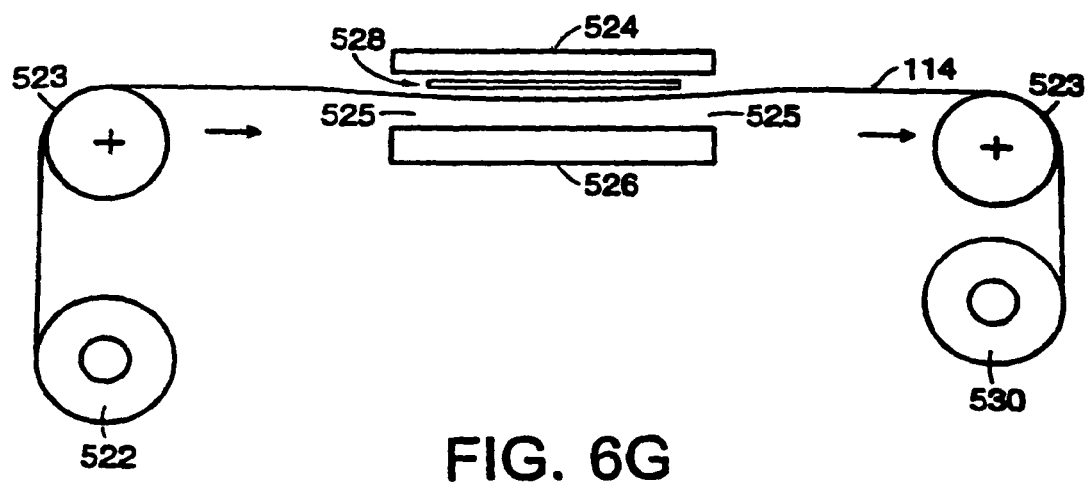
FIG. 6G is a diagrammatic side view of a sheet-form dye sublimation printing apparatus.

For hook-engageable materials, e.g. non-woven materials made of high melting temperature fibers, such as polyester, dye sublimation may be used for printing. Referring to FIG. 6G, in the dye sublimation process a paper substrate 528 which has been printed in desired design with sublimable inks is pressed against a surface of the material 114 and heated to a sufficient temperature, e.g. about 300 degrees Fahrenheit, to cause the ink to sublime. The vapors transfer the printed design to the intimately engaged surface of the hook-engageable material. In the sheet-form dye sublimation printing process of FIG. 6G, the web 114 supplied by roll 522 is indexed and introduced into press station 525 formed between a hot press 524 and a platen 526. At each cycle a sheet-form paper substrate 528 is introduced between hot press 524 and the material 114 and pressed by the hot press 524 onto the surface of the material. The process parameters, e.g., pressure, time and temperature, are selected so that the fibers or yarns of the material maintain their hook-engaging ability. After the completion of each printing cycle the printed web is indexed out of the press station 525 and collected by take-up roll 530.

In a variation of this process, not shown, the substrate 114 is also provided in discrete form so that the entire printing process, and any laminating step, is conducted in a batch or "sheet" process, rather than using continuous materials.

Figure 6H:
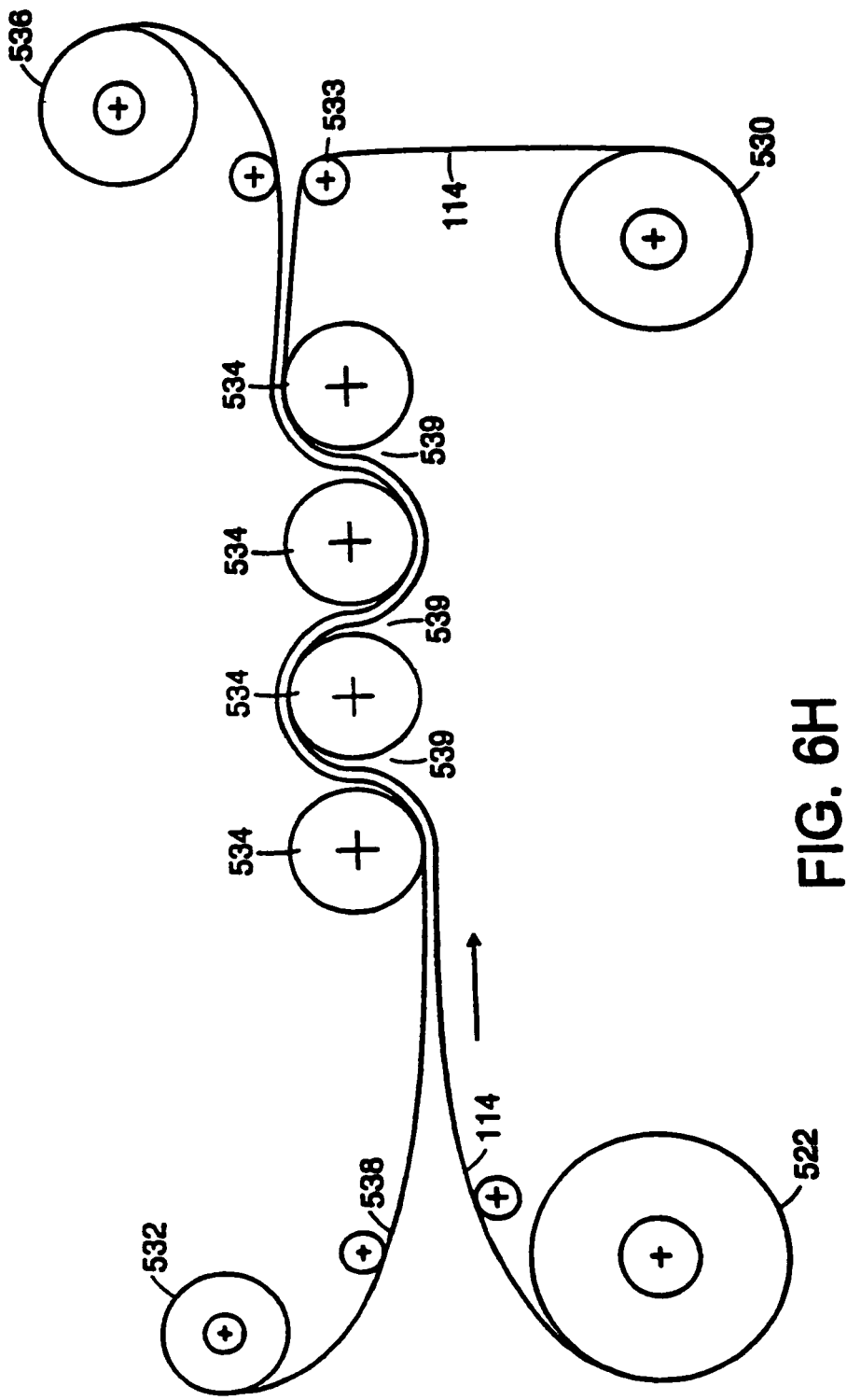
FIG. 6H is a diagrammatic side view of a web-form dye sublimation printing apparatus.

In the web-form dye sublimation printing process of FIG. 6H, a continuous pre-printed paper web 538 travels around the periphery of one or more rotating heated rollers 534 together with the web 114. The print surface of the paper web 538 contacts a surface of the web 114 and the two webs are pressed together and heated as they wind around adjacent hot rollers. After the completion of the printing cycle the paper web is collected by roll 536 and the printed web 114 is collected by roll 530.

The dye sublimation process produces stable, high quality, visually stimulating images, as shown in FIG. 5. As mentioned above, because of their low solid content, dyes have the advantage that they do not clog the hook-engageable fibers or yarns of the material, hence do not impair its fastener characteristics, provided the fibers or yarns have a sufficiently high heat set temperature, i.e., higher than about 300 degrees Fahrenheit, or are protected from the heat such that they are not permanently deformed by the printing pressure. For example the dye sublimation process may apply the design to the backside of the hook-engageable material, while the hook-engageable side is engaged with a cooling roll that prevents permanent deformation of the fibers or yarns from their hook-engageable state. Dye sublimation can be efficient for small production runs, e.g., 2,000 units or less, which makes it attractive for low-volume point of purchase display applications.

It is also useful, in certain instances, to employ combinations of flexographic and dye sublimation printing, e.g. to create point of purchase displays that match the store background color and depict visually stimulating graphic designs.

Figure 7:
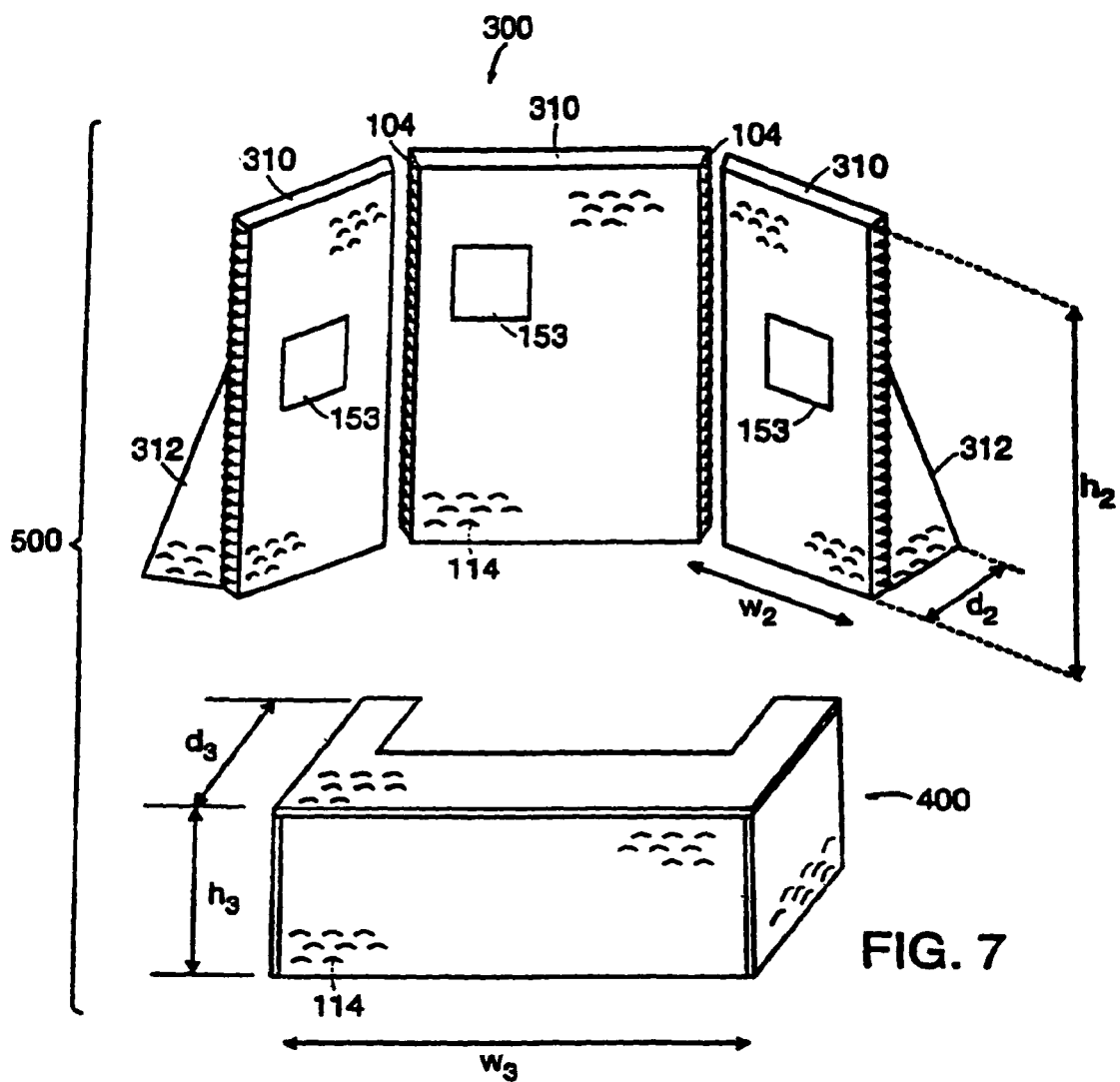
FIG. 7 is a schematic illustration of a trade show booth and a floor display system.

Referring to FIG. 7, a trade show booth 500 includes a table 400 and a self supporting floor display system 300. The floor display system includes display panels 310 supported by a base structure 312. Both the display panels 310 and the base structures 312 are made of corrugated board paper laminated with a hook-engageable non-woven material 114, as described above. The panels 310 are attached together with loop-engageable hooks 104, sized to engage the protruding fibers or yarn loops of the fastener material. In one example a standing floor display panel 310 has height $h_2$ of 6 feet, a width $w_2$ of 4 feet, and, on account of the attached base structure, a depth $d_2$ of 3 feet.

Figure 7A:
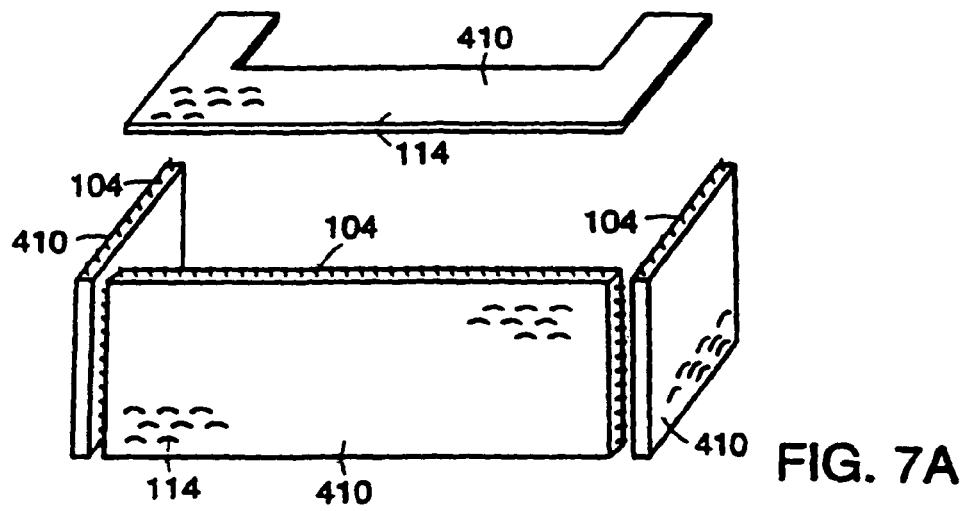
FIG. 7A is an exploded view of the booth of FIG. 7.

The booth table 400 is also constructed of side panels 410 and top 410' of corrugated board laminated appropriately with hook-engageable material 114 where desired. The panels 410 and the top 410' are held together by hooks 104 (FIG. 7A) and form the self-supporting table structure 400. In one example the table 400 has height $h_3$ of 4 feet, a width $w_3$ of 6 feet, and a depth $d_3$ of 3 feet. The hook-engageable material 114 in both the floor display 300 and the table 400 is printed with a company logo, visually stimulating image or design, similar to the ones shown in FIGS. 1 and 5.

Other embodiments of printed light-weight hook-engageable material as described include, among others, pages of a book, which may have a paper or other backing to which the hook-engageable material is laminated, or, in some cases, the hook-engageable material may be provided with sufficient body stiffness (e.g., by provision of sufficient binder) that it has desirable self-supporting, page-like qualities.

Another embodiment comprises "wall paper" composed of printed hook-engageable light-weight material as described, again provided with a suitable laminated backing or itself laminated to a permanent support, or removably supported on a wall by a hook surface which engages hook-engageable fibers or yarns of the printed hook-engageable material.

Figure 10:
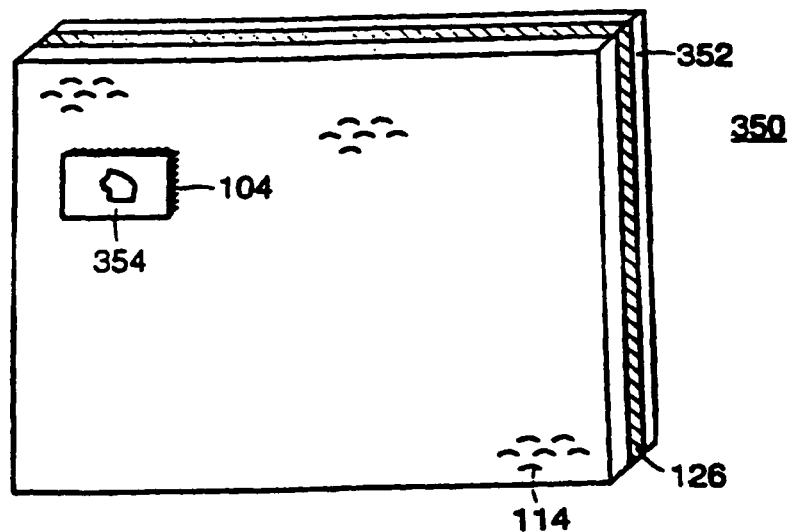
FIG. 10 illustrates a bulletin board composed of hook-engageable material to which an article is attached.

Yet another embodiment comprises a bulletin board, FIG. 10, composed of printed hook-engageable material as described, provided with a suitable laminated backing, i.e., chipboard or foam layer of synthetic resin.

Printed light-weight, hook-engageable material as described, provided with sufficient stiffness (e.g., by provision of sufficient binder) is also used to form a banner or flag. Banners or flags having a printed message combined with an attractive design are used for advertisement or decorative purposes in stores or homes. Printed hook-engageable material bearing safety or promotional messages is also used for aisle markers or floor runners in stores, movie theaters or other indoor or outdoor places.

Printed and/or colored hook-engageable material as described laminated with a suitable backing, i.e., corrugated board, chipboard, synthetic resin foam or as a self-supported member can be used to form a clipboard or a hanging board for displaying merchandise attached to the hook-engageable surface of the material.

Referring to FIGS. 8, 8A and 8B, page 202 of a scrapbook 200 is formed by laminating the printed hook-engageable material sheet 114 as described to a sheet of paper 208, or the material is employed plain. The material sheets are cut to form pages 202 of the desired book size and bound to form the scrapbook 200. Such scrapbooks are useful to organize objects carrying loop-engageable hook fasteners on their back such as photos, cards, art objects, collection items such as coins, stamps, and memorabilia, among others. The displayed objects 204 are removably attached to the hook-engageable surface 114 of the pages with hook fasteners 104 of the types previously described. Because of the fastening system, the specific arrangement of the displayed items can be easily changed by peeling and readjusting their location.

Figure 9:
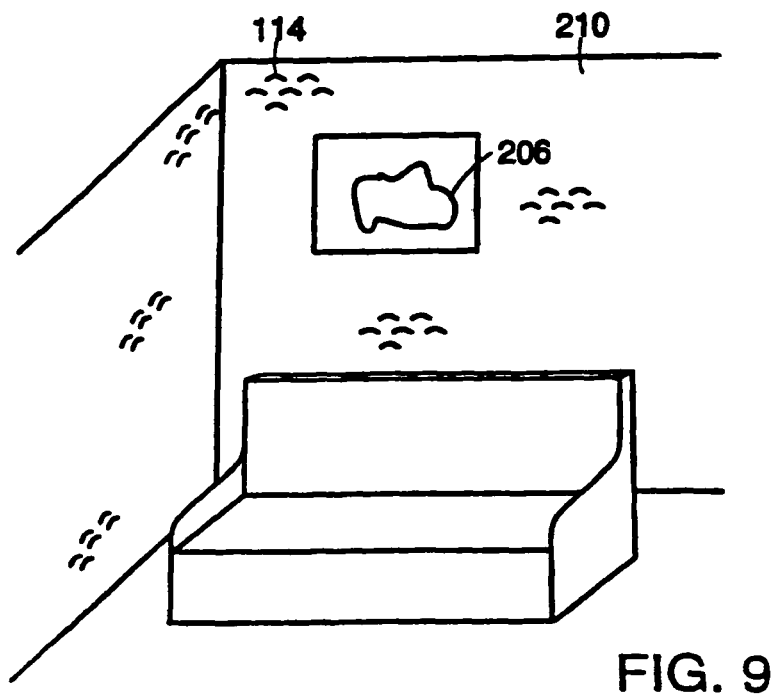
FIG. 9 illustrates a wall paper composed of hook-engageable material to which a wall decoration is attached.
Figure 9A:
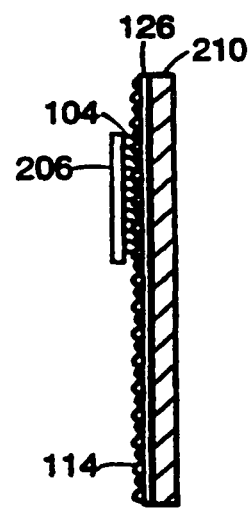
FIG. 9A is a side view of the wall paper of FIG. 9.

Referring to FIGS. 9 and 9A, preprinted hook-engageable light-weight material 114 having designs suitable for wallpaper covers a wall 210. The material 114 is adhered to the wall by an adhesive layer 126, or by a continuous sheet, or edge strips, of loop-engageable hook fasteners that have been pre-applied to the wall or which are supplied pre-engaged by their hooks with the wall paper with a backing of adhesive which is activatable or, if pressure sensitive adhesive has its protective cover removed to adhere to the wall. A picture is attached to the hook-engageable material 114 on the wall by hook fasteners 104.

Referring to FIG. 10, a bulletin board 350 comprises hook-engageable light-weight material 114 as described, laminated to chipboard 352. The material 114 is adhered to the chipboard 352 by a continuous adhesive layer 126. Permanent printing or designs may be included on the material, described above. Pictures 354 or other messages are removably attached to the hook-engageable material by hook fasteners 104.

Figure 11:
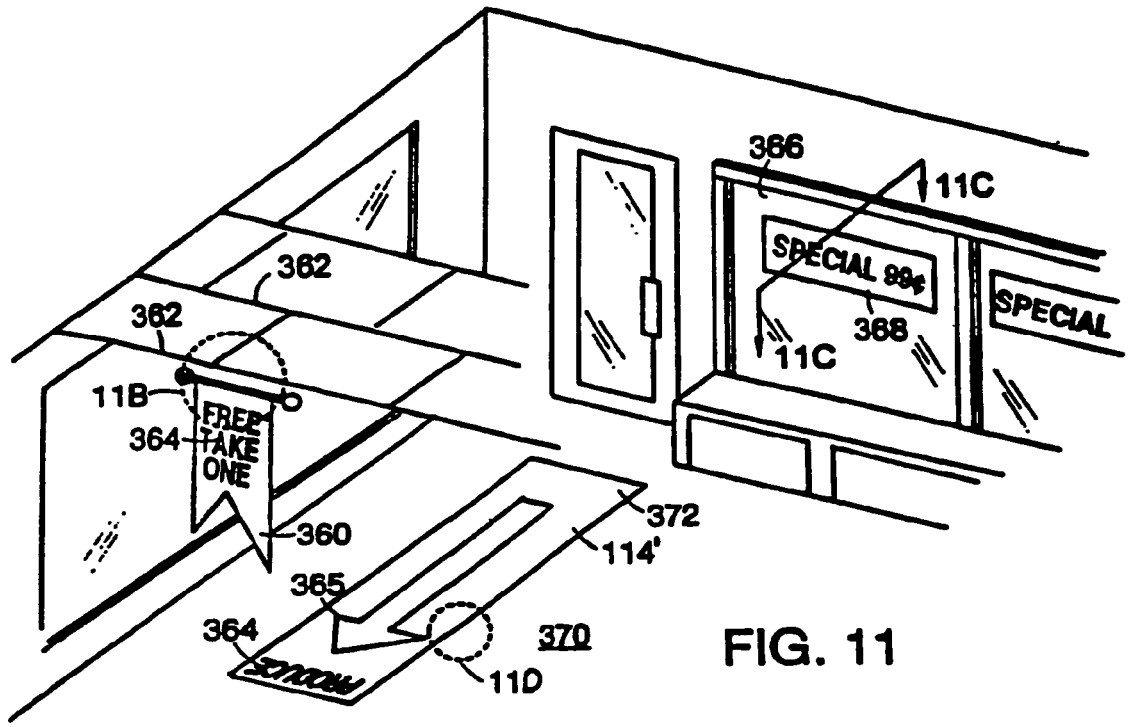
FIG. 11 illustrates a banner and a floor runner composed of hook-engageable material and displayed in a store.
Figure 11D:
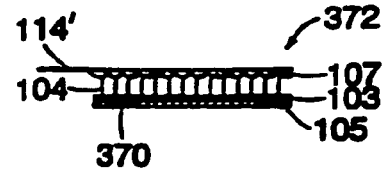
FIG. 11D is similarly a view of area 11D in FIG. 11.
Figure 11C:
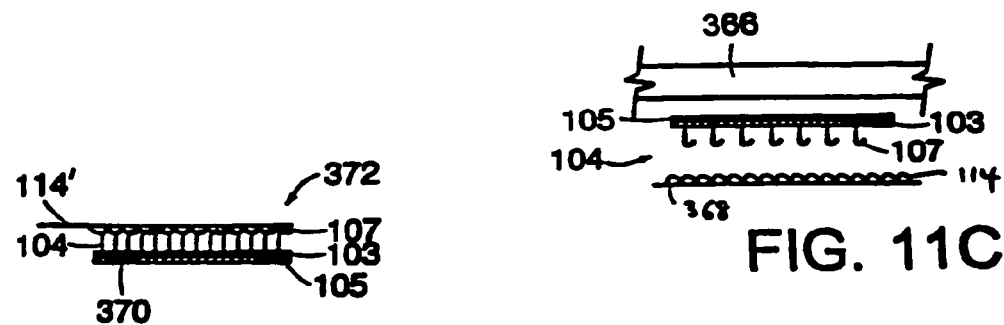
FIG. 11C is a diagrammatic cross-sectional view of area 11C in FIG. 11.
Figure 11A:
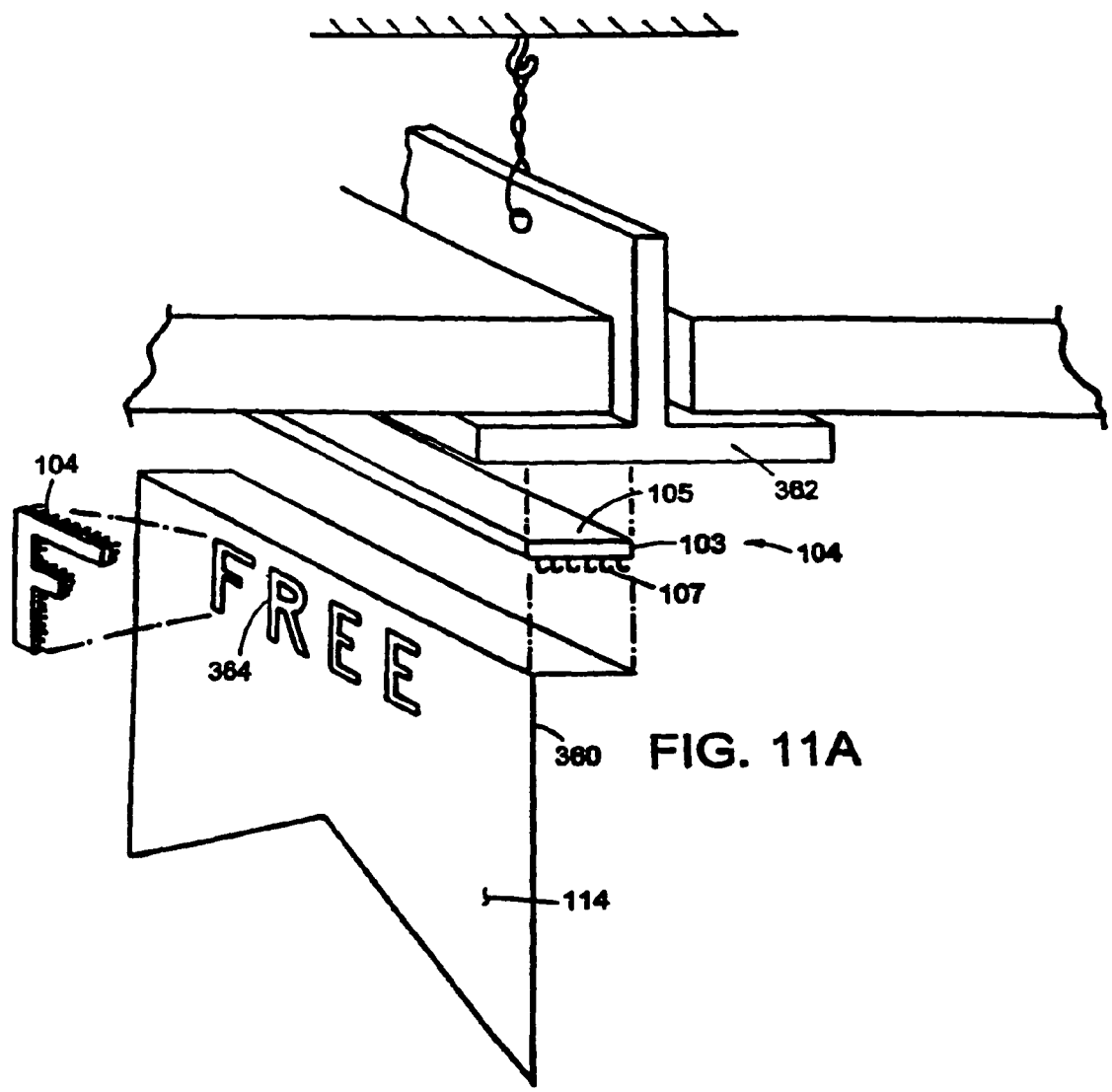
FIG. 11A illustrates a banner and lettering attached to the surface of the banner by hook fastening.

Referring to FIG. 11 and 11A, a pendant banner 360 comprising a self-supporting hook-engageable material 114 and lettering 364 printed on its surface is suspended from a ceiling tile support 362. The hook-engageable material 114 as described above is stabilized with a sufficient amount of binder (e.g., 30 percent or more) to achieve desirable stiffness and self-supporting qualities. In some instances, the letters are detachably attached to the hook-engageable surface of the hook-engageable material 114 by hook fasteners 104, as shown in FIG. 11A. The banner 360 is detachably attached and suspended from the ceiling tile support grid 362 by hook fasteners 104. Hook fasteners 104 have a base 103, hooks 107 integrally molded with the base 103, for engaging the hook-engageable fibers of the material 114 and a pressure sensitive adhesive backing 105 for adhering to the ceiling tiles support 362 (FIG. 11A).

Figure 11B:
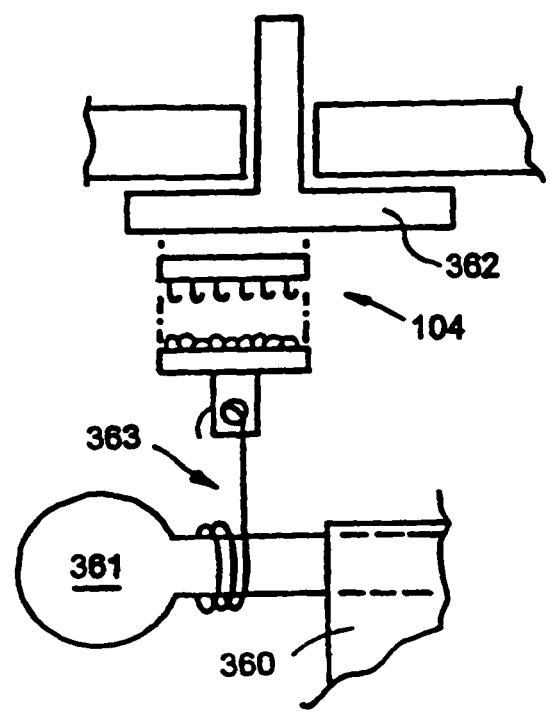
FIG. 11B is a view similar to FIG. 11A of an alternative arrangement.

In one of many possible alternative arrangements shown in FIG. 11B, flag or pennant 360' is secured to a staff or supporting rod 361 which in turn is appropriately supported. As shown rod 361 is supported by a wire support 363, which engages a fastener loop component which engages hooks 107 of hook fastener 104.

In other cases a placard 368 (FIG. 11) is attached to a store-front window 366 for displaying a promotional message, price, advertisement, or a seasonal theme. In this case, the placard is attached to the store front-window by hook fasteners 104 secured to the glass by adhesive 105, (FIG. 11C).

Referring to FIGS. 11 and 11D, a floor runner 372 comprising a relatively heavy weight, self-supporting hook-engageable material 114' with sufficient body stiffness to withstand wear is attached to floor 370. The hook-engageable surface of material 114' is attached to hook fastener strips 104 that are adhered to the floor surface 370. The surface of material 114' opposite the hook-engageable surface bears a printed message 364, directional arrows 365 and/or graphic designs. A needled non-woven material, much heavier than the weight range mentioned above can be appropriate for such heavy duty applications.

In other cases the floor runner comprises a laminate of hook-engageable material of weight less than 4 ounces per yard forming the under surface, and to which an upper durable sheet is laminated, the latter carrying printing on its upper surface.

Figure 12C:
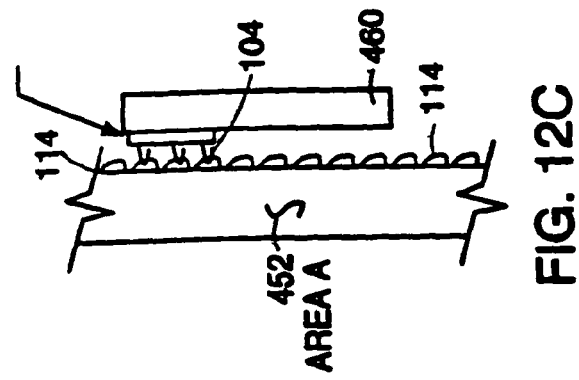
FIG. 12C is magnified view of area A of FIG. 12B.
Figure 12A:
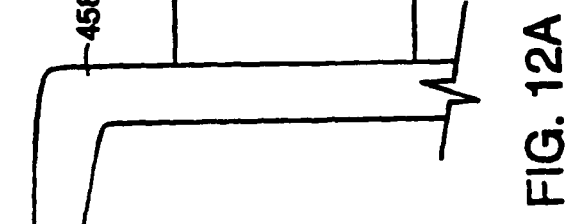
FIG. 12A is a front view of a pendant display clipstrip carrying merchandise.
Figure 12B:
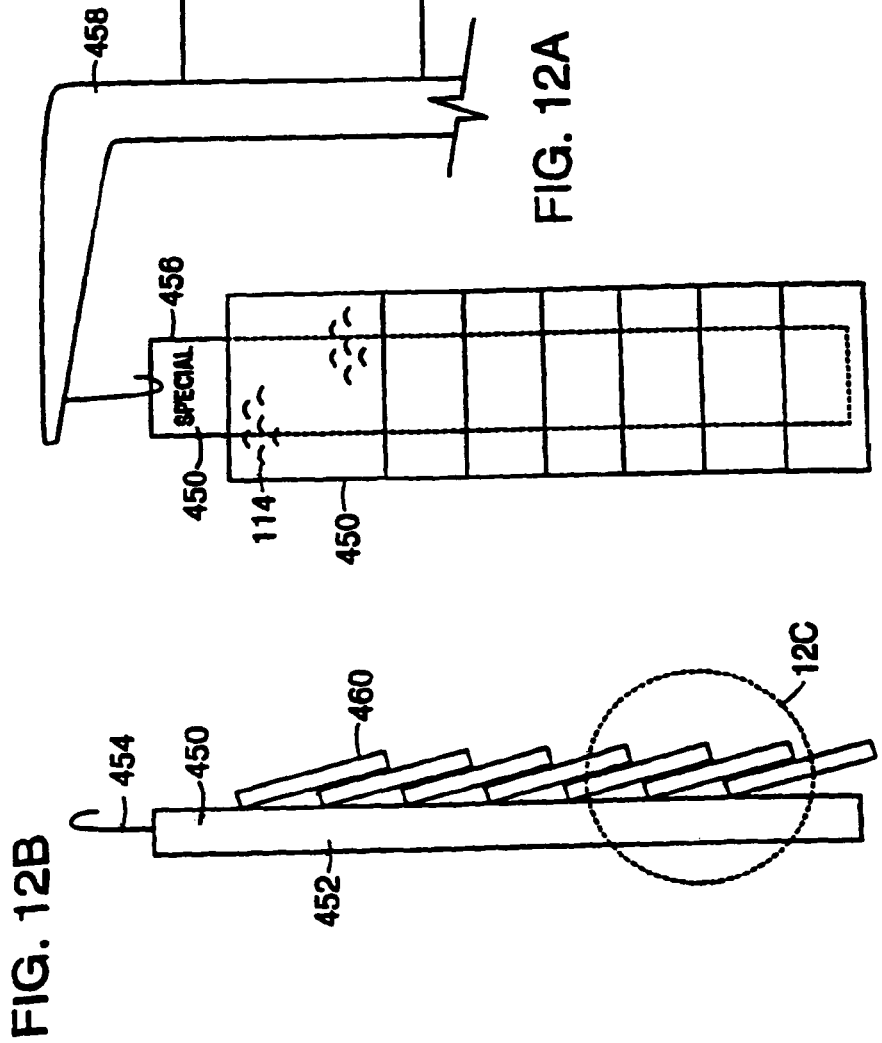
FIG. 12B is a side view of the pendant display clipstrip of FIG. 12A.
Figure 13A:
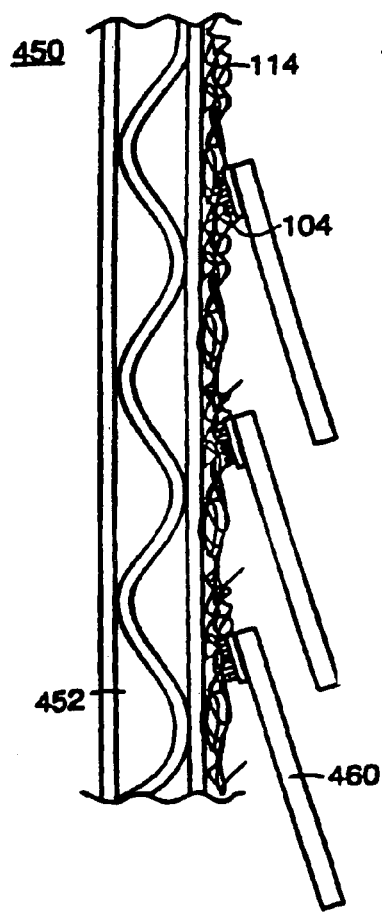
FIGS. 13A, 13B and 13C are side views of pendant display clipstrips carrying merchandise comprising corrugated board, chipboard, and synthetic resin foam, respectively.
Figure 13B:
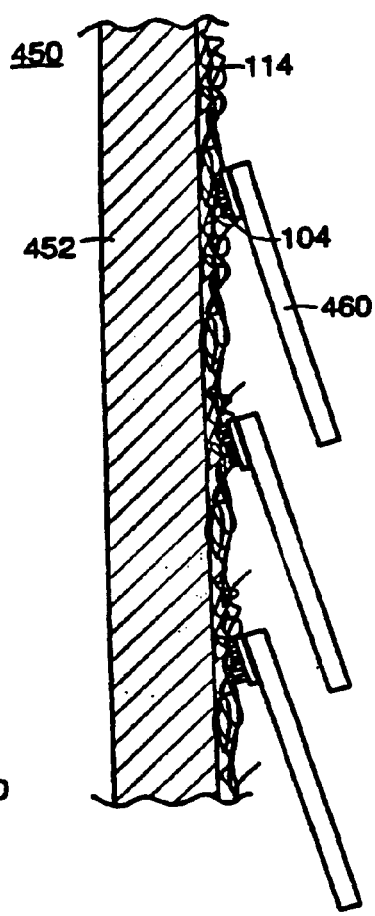
Figure 13D:
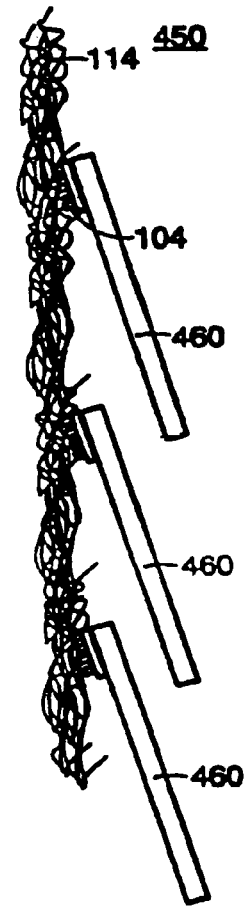
FIG. 13D is a side view of a self supported pendant display clipstrip carrying merchandise.
Figure 13C:
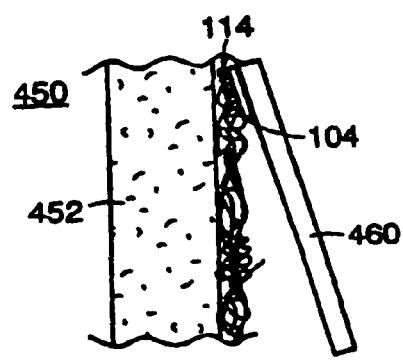

Referring to FIG. 12A, a pendant display "clipstrip" 450 comprises a substrate 452 having a broad surface laminated to a hook engageable material 114. The display "clipstrip" 450 is provided with a hanger 454 (FIG. 12B), a wire loop 456 (FIG. 12A) or a hook and loop fastening system of various available types that engages the engageable surface of non-woven material 114, suitable for attaching the assembly to a support 458. Merchandise 460, such as, razor blades, cards, or candy, among others, are detachably attached to the hook-engageable surface by hook and loop type fasteners 104 (FIG. 12C). The display "clipstrip" backing can be of corrugated board (FIG. 13A), chipboard (FIG. 13B), synthetic resin foam (FIG. 13C), or it can be a self supporting hook-engageable material such as the non-woven material described above (FIG. 13D).

Figure 14:
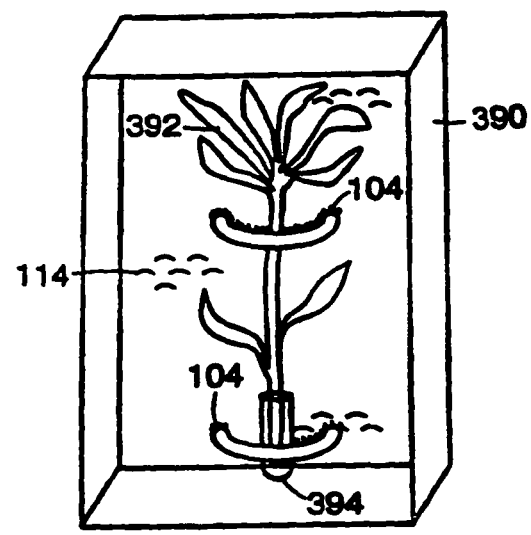
FIG. 14 illustrates a corrugated board box laminated with a hook-engageable material used for displaying and transporting delicate flowers.

Referring to FIG. 14, corrugated board box 390 laminated with the light-weight hook-engageable material 114, described above is used for supporting delicate flowers 392, e.g. an orchid, and vials 394 containing liquid. The stems of flowers 392 and vials 394 are secured to the hook-engageable surface by fastening strips 104 of loop-engageable hooks.

Advantageous results for various embodiments of the invention are achieved by employing thin, low weight, hook-engageable materials of particular constructions.

In the case of laminating a hook-engageable non-woven to form, for instance, the products shown in FIGS. 1 and 2, it is advantageous to employ a non-woven that is resistant to transfer of lamination adhesive through the thickness of the non-woven in a manner that would impair the functionality of the hook-engageable loops or fibers on the functional side. Preferred embodiments of continuous or corrugated laminates, for instance, made with hook-engageable non-wovens according to the needling, fluid binder and stretch technique, employ as a binder a suitably stable foam of a type that, in addition to binding the fibers, forms a substantially continuous, penetration-resistant film that prevents such strike through of the adhesive as would impair effective hook-engageability. After curing of the binder, the laminating adhesive may be applied to the cured film, or to the substrate receiving the film-side of the non-woven, followed by the laminating step. Other hook-engageable non-wovens, as well as other low-density hook engageable materials, are similarly treated for corresponding effects.

Stable foam binders that form a continuous film across the non-working side of very thin loop material can also enhance the clarity of images subsequently printed on the working side of the loop material, as the film receives and supports the ink of the image in the open areas between the loop bases of the gossamer-like loop material. The penetration of such stable foams can be very accurately controlled, making them particularly useful in coating very thin, permeable loop materials as those contemplated herein. By controlling blow ratio, viscosity, temperature, thickness and applicator pressure, stable foam binders may be applied in such a manner that they do not flow through to the loop side of the web, binding only the tightened knots of the web at the loop bases and the inter-knot fibers and not impairing the hook-engageability of the loops.

For example, a useful loop material having such a film-forming binder was produced by applying a stable foam binder to the non-loop side of a needled web of 4 inch, 6 denier staple polyester fibers (needled as disclosed in U.S. patent application Ser. No. 08/922,292) while the web was being stretched 40 percent in its cross-machine direction and 25 percent in its machine direction. The binder was resin "1060A", available from B.F. Goodrich and containing a foam stabilizer and foaming and blowing agents. The binder was foamed with a blow ratio of 10:1 (air:resin volumetric ratio) and applied to the stretching web with a 50 inch wide head of a Gaston County parabolic coater, in a coat-down configuration, at a rate of 4.1 liters per minute and a curing temperature of about 330 degrees Fahrenheit, while the web was traveling at a rate of 25 yards per minute. The applicator pressure was adjusted to apply the binder as a smooth, laminar coat with trapped bubbles substantially intact and which did not permeate through to the loops of the web material. To help avoid extruding the binder through the web, the aft positioning bar of the applicator head was lowered to relieve pressure between the trailing edge of the applicator head and the web. The thickness of the foam binder layer, as applied, was about $1/8$ inch, and cured to a thickness of less than about $1/32$ inch. Cured, the binder formed a thin, continuous film on the back side of the loop material and worked to support ink subsequently applied from the loop side of the material. The final loop material remained flexible enough to pass through printing equipment.

It is desirable in some instances for the binder to provide a given translucency or opaqueness as cured. Color additives may also be employed, such that the binder and hook-engageable material are of similar or complementary colors. For printing, cured binder film thicknesses of about $1/16$ or less are preferred, as adequate to support ink.

In some cases, it is desirable to apply the stable foam binder after stretch, especially when stretching the loop material to high stretch ratios, such that the binder is not stretched as applied. In other cases, stretching the binder coat before or during curing can provide an even thinner film coating, and can help to accumulate binder at the fiber knots of the base as the base fibers wipe across one another during stretching. The necessary drying time will be longer for thicker binder coatings. Cured binder film having thicknesses ranging from about 0.002 to 0.2 inch or more are useful for different applications.

Even the low thickness of the cured binder coating of the product in the above-described example gave the resulting loop material a desirable compliance and resiliency when subsequently laminated to a hard surface. The foam layer gave the thin loop material a greater degree of "springiness" than when laminated without such a binder layer. This compliance is useful for engaging hooks, perhaps by causing shear forces to be locally developed in the plane of the loop material in the edges of a region depressed by an engaging hook material.

The rigidity of the stabilized non-woven material, with its continuous film binder coat, can be controlled by proper formulation of the binder material. In one application, the loop product of the above-described example is sufficiently compliant to be run through a Pot Devin laminating machine, in which it is laminated to the continuous paper side of a corrugated paper board. The film binder coat prevents the laminating adhesive from penetrating the loop material and fouling the hook-engageable loops or fibers. As laminated, the foam binder layer provides useful resiliency for hook engagement.

In the case of printed floor runners formed of hook-engageable non-woven material (see FIG. 16, for example), the binder is selected to provide both a printable surface and properties that contribute to the function of a floor runner (e.g., increased durability and/or a cushioning effect). Likewise, appropriate binder rigidity can be particularly useful in forming banners (see FIGS. 11 and 11A).

For another application, hot melt glue is applied to the cured non-woven from a spray gun and cooled. The resulting product is formed into a roll for sale. In subsequent use, the adhesive-coated product is passed through a hot can (rotating cylinder) laminator to activate the adhesive prior to being laminated to another material.

Alternatively, heat-activated adhesives in web form may be employed for lamination. Suitable web form adhesives include BOSTIK sewing tape (web adhesives PA115, PO90 and PE85), "LYONS COAT" LM78-6B water based adhesive, many of the "REICH-O-MELT" line of pressure sensitive hot melt adhesives and the "EVER-LOCK" polyurethane hot melt adhesives available from Reichhold in Research Triangle Park, N.C.

In another example, a water-based wicking binder was applied to a needled web during stretching. Applied as a non-stable foam, this binder immediately de-aerated to liquid form to wick into the entanglements of the loop material to stabilize the material in its stretched state. The binder was a mixture of resins "NACRYLIC X 4280" (80%) and "X-LINK 2804" (20%), available from National Starch and Chemical Co. The resin mixture was foamed with a blow ratio of 10:1 and applied to the stretching web with a Gaston County parabolic coater, in a coat-down configuration. B.F. Goodrich resin "1030", aerated to a blow ratio of 15:1, has also been employed as an acceptable stable binder.

For other applications, stable foam binders are applied to non-woven loop materials of greater thickness and basis weight than those described above, or needled webs with lower post-needling stretch ratios (e.g., of 10 to 100 percent stretch ratios) to secure the hook-engageable loops of the material or to add an impermeable film coating to the loop material for subsequent lamination. Very low weight (i.e., 2 ounces or less per square yard), low density tricot or other knits are also economical for some applications. With some materials, the solids content of the binder may be reduced to about 10 to 25 percent.

Other suitable binders and adhesives may include polyvinyl acetate glue (white school glue), aliphatic glue (yellow wood glue), starch-based glue, and animal hide glue. Specific examples include Reichhold's "REICH-O-BOND" line of pressure sensitive adhesive emulsions; B.F. Goodrich's "HYCOR" acrylic and nitrile emulsions, "VYCOR" PVC emulsions, "GOOD-RITE" styrene-butadiene emulsions and "SANCURE" polyurethane dispersions; and National Starch and Chemical Co.'s polymeric emulsions such as "NACRYLIC" acrylic, "X-LINE" acrylic copolymer, "DUROSET" EVA and "RESLYN" vinyl acrylic emulsions.

In forming wall paper and similar coverings, as shown in FIG. 9, a water-impervious binder, suitable to form a smooth back surface on the hook-engageable material, is applied and cured. Subsequently, a water-activatable (e.g., starch-based) wallpaper adhesive is applied to the smooth surface and dried. For application, the wallpaper hanger wets and activates the adhesive and applies the hook-engageable non-woven material to suitable walls and other surfaces.

In forming clip strips for merchandise displays as shown in FIGS. 12 and 13, it is advantageous in many instances that the binder of the hook-engageable non-woven material provide structural characteristics suitable to carry the weight of the objects being displayed without distortion, and to provide durability for reuse. In certain cases the binder is preferably selected to provide stiffness or to have a leathery appearance and performance. Stable foam binders are particularly useful in this regard.

Other features, advantages and embodiments of the invention will be realized by those of skill in the art and are within the scope of the following claims.

What is claimed is:

1. A method of forming a material for use in a display system, the method comprising:
   combining yarns or fibers to form a fabric body;
   finishing the fabric body to form a hook-engageable material having a basis weight of less than about 4 ounces per square yard and comprising a generally sheet-form web body having first and second oppositely directed, exposed surfaces, including
      forming a plurality of hook-engageable loops on the first surface of the web body; and
   printing a graphic design on the second surface of the sheet-form web both in a manner that results in the printed design being visible through the web body; and
   applying a stable foam binder to the hook-engageable material.

2. The method according to claim 1, wherein the hook-engageable material has a basis weight of about 2 ounces per square yard or less.

3. The method according to claim 1, wherein the binder constitutes between about 20 percent and about 40 percent of the weight of the hook-engageable material.

4. The method according to claim 1, wherein the hook-engageable material comprises a non-woven material.

5. The method according to claim 4, wherein forming the plurality of hook-engageable loops comprises needle-punching the non-woven material.

6. The method according to claim 5, wherein forming the plurality of hook-engageable loops further comprises stretching the non-woven material.

7. The method according to claim 6, wherein the non-woven material is finished to have, at least 100 percent areal stretch.

8. The method according to claim 6, wherein the non-woven material has a substantially varied areal density of fibers over its surface.

9. The method according to claim 8, wherein the non-woven material has a ratio of high to low areal densities being at least four to one.

10. The method according to claim 6, wherein forming the plurality of hook-engageable loops further comprises stabilizing the non-woven material in a stretched condition.

11. The method according to claim 10, wherein stabilizing the non-woven material in a stretched condition comprises applying a binder to the non-woven material in the stretched conditions.

12. The method according to claim 11, wherein the binder forms a thin, continuous film on the second surface of the non-woven material.

13. The method according to claim 1, wherein printing the graphic design comprises flexographic printing.

14. The method according to claim 1, wherein printing the graphic design comprises dye sublimation printing.

15. The method according to claim 1, wherein printing the graphic design comprises electrostatic printing.

16. The method according to claim 1, wherein printing the graphic design comprises ink-jet printing.

17. The method according to claim 1, wherein the graphic design comprises a dye-based print.

18. The method according to claim 1, further comprising, subsequent to printing the graphic design, laminating the second surface of the material to a substrate to form a laminate.

19. The method according to claim 18, wherein the substrate is selected from the group consisting of: paper, wood, synthetic, foam, chipboard, wallboard, metal, plastic, and cork.

20. The method according to claim 1, wherein the graphic design is printed after the hook-engageable loops are formed.

21. The method according to claim 20, wherein the graphic design is printed while substantially maintaining the hook engageability of the material.

22. The method according to claim 1, wherein the hook-engagrable material comprises areas with relatively high areal density of fibers or yarns interspersed with areas with relatively low areal density of fibers or yarns, the density of fibers or yarns in areas of highest areal density being greater by a factor of at least four from the density of fibers or yarns in areas of lowest areal density, wherein printing the graphic design comprises printing over areas of highest and lowest areal density of fibers or yarns.

23. The method according to claim 1, wherein the hook-engageable material has an overall thickness of less than about 0.050 inch.

24. The method according to claim 1, wherein the fabric body comprises staple polyester yearns of between 18 and 4 denier.

25. The method according to claim 1, wherein printing the graphic design comprises printing with an ink having low solid pigment and dispersed dye content.

26. The method according to claim 1, wherein printing the graphic design comprises printing with an ink having a solid pigment content and dispersed dye content.

27. A method of forming a material for use in a display system, the method comprising:
  combining yarns or fibers to form a fabric body;
  finishing the fabric body to form a hook-engageable material having a basis weight of less than about 4 ounces per square yard and comprising a generally sheet-form web body having first and second oppositely directed, exposed surfaces, including
    forming a plurality of hook-engageable loops on the first surface of the web body; and
  printing a first portion of a graphic design on the first exposed surface of the hook-engageable material without substantially impairing the hook-engageability of the loops, and
  printing a second portion of the graphic design on the second exposed surface of the hook-engageable material,
  wherein the hook-engageable material is at least partially transparent such that the first and second portions together form the graphic design which is viewable from the first surface.

* * * * *

UNITED STATES PATENT AND TRADEMARK OFFICE
CERTIFICATE OF CORRECTION

| | | |
|---|---|---|
| PATENT NO. | : 8,500,940 B2 | Page 1 of 1 |
| APPLICATION NO. | : 11/321825 | |
| DATED | : August 6, 2013 | |
| INVENTOR(S) | : William H. Shepard | |

It is certified that error appears in the above-identified patent and that said Letters Patent is hereby corrected as shown below:

In the Claims

Column 20, Claim 1, line 36, delete "disp1ay" and insert -- display --;

Column 20, Claim 1, line 47, delete "both" and insert -- body --;

Column 20, Claim 7, line 66, delete "have," and insert -- have --;

Column 21, Claim 11, line 13, delete "conditions." and insert -- condition. --;

Column 21, Claim 19, line 33, delete "synthetic," and insert -- synthetic --;

Column 21, Claim 22, line 41, delete "engagrable" and insert -- engageable --;

Column 22, Claim 24, line 12, delete "yearns" and insert -- yarns --.

Signed and Sealed this
Eighth Day of October, 2013

Teresa Stanek Rea
*Deputy Director of the United States Patent and Trademark Office*